United States Patent
Ogawa et al.

(10) Patent No.: US 7,077,425 B2
(45) Date of Patent: Jul. 18, 2006

(54) HEAD PROTECTING AIRBAG DEVICE

(75) Inventors: Hiroshi Ogawa, Aichi-ken (JP); Masao Kino, Aichi-ken (JP); Eishichi Nakamura, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/656,871

(22) Filed: Sep. 8, 2003

(65) Prior Publication Data

US 2004/0075257 A1 Apr. 22, 2004

(30) Foreign Application Priority Data

Sep. 19, 2002 (JP) .............................. 2002-272983
Sep. 27, 2002 (JP) .............................. 2002-282929
Oct. 28, 2002 (JP) .............................. 2002-313132

(51) Int. Cl.
*B60R 21/22* (2006.01)

(52) U.S. Cl. ................................................. 280/730.2
(58) Field of Classification Search ............ 280/730.2, 280/730.1, 743.1
See application file for complete search history.

(56) References Cited

U.S. PATENT DOCUMENTS

| | | | |
|---|---|---|---|
| 6,237,937 B1 * | 5/2001 | Kokeguchi et al. | 280/730.2 |
| 6,293,581 B1 * | 9/2001 | Saita et al. | 280/730.2 |
| 6,338,498 B1 | 1/2002 | Niederman et al. | |
| 6,450,529 B1 | 9/2002 | Kalandek et al. | |
| 6,460,879 B1 * | 10/2002 | Tanase et al. | 280/730.2 |
| 6,655,713 B1 * | 12/2003 | Tanase et al. | 280/743.1 |
| 6,846,010 B1 * | 1/2005 | Enders | 280/730.2 |
| 2002/0024203 A1 | 2/2002 | Takahashi | |

FOREIGN PATENT DOCUMENTS

| | | |
|---|---|---|
| DE | 100 49 530 A1 | 10/1999 |
| JP | A-H09-254737 | 9/1997 |
| JP | A-2000-6747 | 1/2000 |
| JP | A-2000-52911 | 2/2000 |
| JP | A-2000-335351 | 12/2000 |
| JP | A-2001-114058 | 4/2001 |

* cited by examiner

*Primary Examiner*—Faye M. Fleming
(74) *Attorney, Agent, or Firm*—Posz Law Group, PLC

(57) ABSTRACT

A head protecting airbag device according to the present invention includes a gas admissive portion and a non-admissive portion. The gas admissive portion includes a gas feed passage disposed along the upper edge of the airbag, and an inflatable shielding portion located below the gas feed passage for covering the inner side of the windows upon deployment. The inflatable shielding portion includes a plurality of protection portions and a plurality of vertical passages vertically disposed in the front and rear of each of the protection portions. The protection portions are juxtaposed along the front-rear direction of the vehicle. The vertical passages are communicated at upper ends with the gas feed passage. Each of the protection portions admits inflation gas via the vertical passages.

5 Claims, 14 Drawing Sheets

HEAD PROTECTING AIRBAG DEVICE

The present application claims priority from Japanese Patent Applications No. 2002-272983 filed on Sep. 19, 2002, No. 2002-282929 filed on Sep. 27, 2003, and No. 2002-313132 filed on Oct. 28, 2003, the entireties of which are hereby incorporated into the present application by this reference.

BACKGROUND OF THE INVENTION

1. Field of the Invention

The present invention relates to a head protecting airbag device whose airbag is normally folded and housed in the upper edge of windows in the interior of vehicle, and deploys to cover the interior of the windows upon inflow of inflation gas.

2. Description of Related Art

In the prior art, Japanese Patent Laid-Open No. 2000-6747 is illustrative of a head protecting airbag device in which an airbag includes a gas feed passage located in the upper edge side thereof and an inflatable shielding portion located below the gas feed passage for covering the interior of windows upon deployment. The inflatable shielding portion includes a protecting portion and a vertical passage located rearward of the protecting portion. Inflation gas, when flowing in, flows through the vertical passage into the inflatable shielding portion from the lower end of the protection portion.

However, the prior art discloses an airbag with only one protecting portion, and can hardly be applied to an airbag with a plurality of protecting portions.

Japanese Patent Laid-Open No. 2000-335351 and 2000-52911 are also illustrative of head protecting airbag devices in which the protecting portions are configured such that the energy absorbing property thereof may not be affected largely by the position shift of occupant's heads in the horizontal direction.

However, in these head protecting airbag devices, since airbags upon deployment are expanded while inflating, there was a problem of the protecting portion's not being interposed between windows and occupants smoothly.

These head protecting airbag devices also have difficulty in securing vertical shape retention upon completion of inflation because of wrinkles causable in an uninflatable portion arranged in the horizontal direction or in a protecting portion.

Moreover, Japanese Patent Laid-Open No. Hei 9-254737 discloses in FIG. 6 a head protecting airbag device in which an airbag normally folded and housed in the upper edge side of a vehicle includes a window-ward shielding portion for covering the interior of windows, and a roof-ward shielding portion for covering the interior of body member in the roof side rail, respectively upon completion of inflation.

With this configuration, upon inflow of inflation gas, the airbag expands and inflates the roof-ward shielding portion upward while expands and inflates the window-ward shielding portion downward. Therefore, when an impact is applied to a vehicle occupant to shift toward the window in such a situation as side-impact collision, if the moving speed of the occupant toward the window is fast, the occupant may not be protected properly by the window-ward shielding portion.

SUMMARY OF THE INVENTION

A first object of the present invention is to provide a head protecting airbag device whose airbag, when including a plurality of protecting portions corresponding to the number of occupants, is able to expand respective protecting portions smoothly between windows and occupants.

A second object of the present invention is to provide a head protecting airbag device capable of protecting vehicle occupants properly upon collision.

The first object of the present invention is achieved by a head protecting airbag device as follows:

A head protecting airbag device including an airbag folded in the upper edge of windows inside a vehicle in undeployed condition, and deployable upon inflow of inflation gas to cover the vehicle's inner side of the windows, the airbag including: a gas admissive portion inflatable by admitting inflation gas while separating an inner side wall and an outer side wall respectively thereof; and a non-admissive portion admitting no inflation gas, the gas admissive portion including a gas feed passage and an inflatable shielding portion, the gas feed passage being disposed along the upper edge of the airbag extending in the front-rear direction of the vehicle, the inflatable shielding portion being located below the gas feed passage for covering the inner side of the windows upon deployment, the inflatable shielding portion including: a plurality of protection portions juxtaposed along the front-rear direction of the vehicle; and a plurality of vertical passages vertically disposed in the front and rear of each of the protection portions, the vertical passages being communicated at upper ends with the gas feed passage, and each of the protection portions admitting inflation gas via the vertical passages, whereby protecting heads of occupants upon deployment of the airbag.

In the head protecting airbag device with this construction, the vertical passages are located in the front and rear of each of the protection portions in the airbag for sending inflation gas from the gas feed passage out to the protection portions. The vertical passages extend downward with the upper ends communicated with the gas feed passage. In this relation, in the initial stage of inflation of the airbag, the vertical passages are unfolded with the inflation gas from the gas feed passage, and extend downward firstly. Then each of the protection portions disposed between the vertical passages is unfolded and expands along with unfolding of the vertical passages, in a thin condition admitting as little inflation gas as possible. Accordingly, even if a space between the windows and occupants' heads is narrow, the individual protection portions are able to expand therein quickly, and protect the occupants' heads properly with subsequent inflation.

In the head protecting airbag device according to the present invention, therefore, even if the airbag includes a plurality of protection portions, the individual protection portions are expanded smoothly in a space between the windows and occupants' heads, and the occupants' heads are protected properly with subsequent inflation of the airbag.

In the head protecting airbag advice with above construction, it is desired that the inflatable shielding portion further includes each one communication passage below each of the protection portions and along the lower edge of the airbag extending in the front-rear direction, each of the communication passages being communicated with the vertical passages, and that each of the protection portions admits inflation gas via the vertical passages and then via the communication passage.

With this construction, when the individual protection portions expand along with unfolding of the vertical passages, the protection portions expand in further uninflated condition. Meanwhile, since the communication passage is located in the front-rear direction along the lower edges of the protection portions, the lower edges of the protection portions disposed between the vertical passages are securely expanded over the entire area. Accordingly, even in cases in which the heads of vehicle occupants are further approximate to the windows, the individual protection portions are securely expanded between the windows and occupants' heads.

It is further desired that, out of the protection portions, at least a foremost protection portion for covering a window at the side of front seat upon airbag deployment includes a plurality of vertical inflatable portions juxtaposed along the front-rear direction of the vehicle, each of the vertical inflatable portions being disposed vertically and being communicated at lower end thereof with the communication passage.

With this construction, each of the individual vertical inflatable portions constituting a front-seat protection portion inflates by admitting inflation gas from the lower end. When the front-seat protection portion is unfolded and expands along with the unfolding of the vertical passages, accordingly, the front-seat protection portion is expanded in an even thinner, uninflated condition substantially over the entire area. In this head protecting airbag device, furthermore, since each of the vertical inflatable portions inflates with inflation gas while reducing the width in the front-rear direction, there is exerted a tension along the vehicle's front-rear direction in the lower edge of the front-seat protection portion upon completion of inflation of the airbag. That is, by inflating the airbag so as to exert a tension in the lower edge of the front-seat protection portion, the front-seat protection portion completely inflated is able to protect an occupant seated in the front seat properly by preventing the occupant from moving outward of the vehicle. Accordingly, the front-seat protection portion of this construction will be suitably adopted in a front seat in which a front pillar is arranged obliquely relative to a pillar located at the side of the front seat, and thus the side window has large opening area.

It is also desired that the protection portion includes a plurality of transverse inflatable portions juxtaposed in the vertical direction, each of the transverse inflatable portions being disposed along the front-rear direction of the vehicle and being communicated with the vertical passages, and that the inflatable shielding portion further comprises a plurality of vertical inflatable portions vertically disposed next to the vertical passages in the front and rear of the vertical passages.

It will also be appreciated that the protection portion includes a plurality of non-admissive portions disposed spottedly, thereby forming trifurcated inflation tops in the middle of the non-admissive portions, and that the inflatable shielding portion includes a plurality of vertical inflatable portions vertically disposed next to the vertical passages in the front and rear of the vertical passages.

With the former construction, the protection portions for protecting the occupants' heads are composed of a plurality of transverse inflatable portions disposed along the vehicle's front-rear direction. With the latter, trifurcated inflation tops are formed in the protection portions. With either construction, energy absorbing property of the protection portions does not vary so much even if the heads of occupants shift in the front-rear direction.

The second object of the present invention is achieved by a head protecting airbag device with the following construction:

A head protecting airbag device including: an airbag folded in the upper edge of windows inside a vehicle in undeployed condition, and deployable upon inflow of inflation gas; and an inflator for supplying inflation gas to the airbag, the airbag including a gas admissive portion inflatable upon inflow of inflation gas, the gas admissive portion including: a window-ward shielding portion for covering the vehicle's inner side of the windows; and a roof-ward shielding portion for covering the vehicle's inner side of a body-ward member in a roof side rail located above the windows, respectively upon deployment, and the window-ward shielding portion being positioned upstream than the roof-ward shielding portion in the flow of inflation gas.

In this head protecting airbag device, since the window-ward shielding portion admits inflation gas prior to the roof-ward shielding portion, the window-ward shielding portion inflates more swiftly than the roof-ward shielding portion. Accordingly, even if the occupants move toward the windows immediately upon collision, the occupants are protected by the window-ward shielding portion swiftly and properly. Since the airbag further includes the roof-ward shielding portion for covering the vehicle's inner side of a body-ward member in the roof side rail, the occupants are properly protected by the roof-ward shielding portion inflated, even if the occupants move toward the roof side rail after shifting toward the window-ward shielding portion.

Therefore, the head protecting airbag device of the above construction is able to protect the occupants securely upon collision by the deployed airbag.

In this airbag device, it is desired that the airbag further includes a plurality of mounting portions at the upper edge of the window-ward shielding portion for securing the airbag to the body-ward member in the upper edge of the windows, and that the mounting portions are disposed in the area of the roof-ward shielding portion, and have slits in the upper periphery thereof.

With this construction, the roof-ward shielding portion surrounds the mounting portions upon deployment of the airbag. Even if the occupants engage the vicinity of the mounting portions of the airbag in the roof side rail upon collision, the occupants come to engage the roof-ward shielding portion inflated and surrounding the mounting portions. Consequently, the occupants are properly prevented and protected from directly engaging mounting brackets and bolts of metal for securing the mounting portions to the body.

It is also desired that: the inflator is located in the upper edge of the windows; the airbag includes a joint port disposed in the upper edge of the windows so as to be connected to the inflator; and that the roof-ward shielding portion includes a cover portion for covering the vehicle's inner side of the inflator upon deployment of the airbag.

With this construction, the cover portion of the roof-ward shielding portion covers the vehicle's inner side of the inflator upon deployment of the airbag. Even if the occupants engage the vicinity of the inflator in the roof side rail upon collision, the occupants come to engage the inflated cover portion. Consequently, the occupants are properly prevented and protected from directly engaging the inflator.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
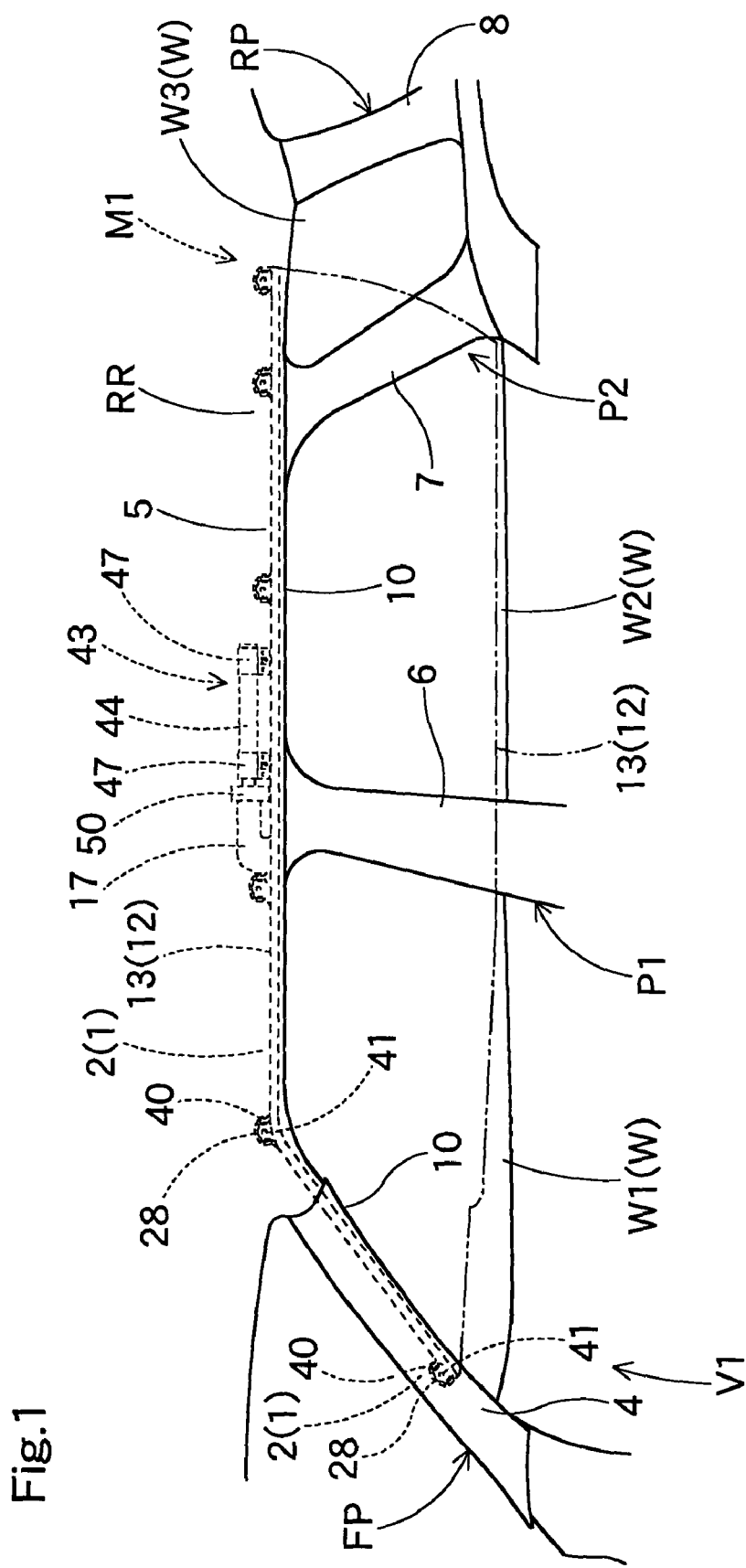
FIG. 1 is a schematic front view of a first embodiment of the head protecting airbag device according to the present invention, as viewed from the vehicle's inner side.

FIG. 1 illustrates a first head protecting airbag device M1 to achieve the first object of the present invention. The airbag device M1 is mountable on a vehicle V1, and includes an airbag 12, an inflator 43, mounting brackets 40, 47, and an airbag cover 10. The airbag 12 is folded and housed in the lower edges of a front pillar FP and a roof side rail RR in the upper periphery of doors and windows W (W1, W2 and W3) inside the vehicle.

As shown in FIG. 1, the airbag cover 10 is constituted by the lower edges of each of a pillar garnish 4 arranged on the front pillar FP and a roof head lining 5 arranged on the roof side rail RR. The airbag cover 10 is located to cover the interior of the folded and housed airbag 12, and is openable inward of the vehicle pushed by the airbag 12 for allowing the airbag 12 expanding and inflating to protrude inward of the vehicle.

Figure 3:
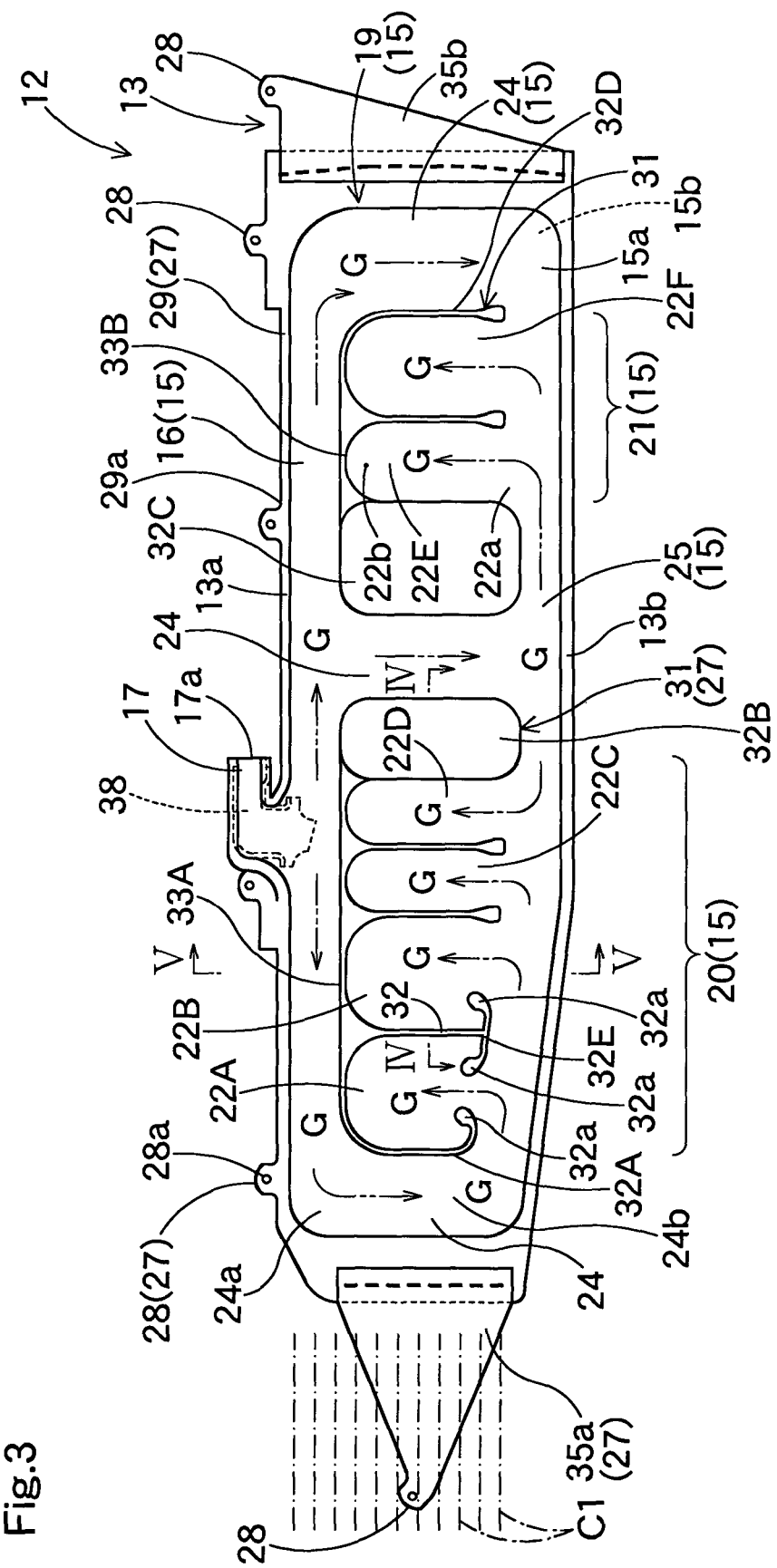
FIG. 3 is a front view of an airbag used in the airbag device of FIG. 1 flatly expanded.
Figure 4:
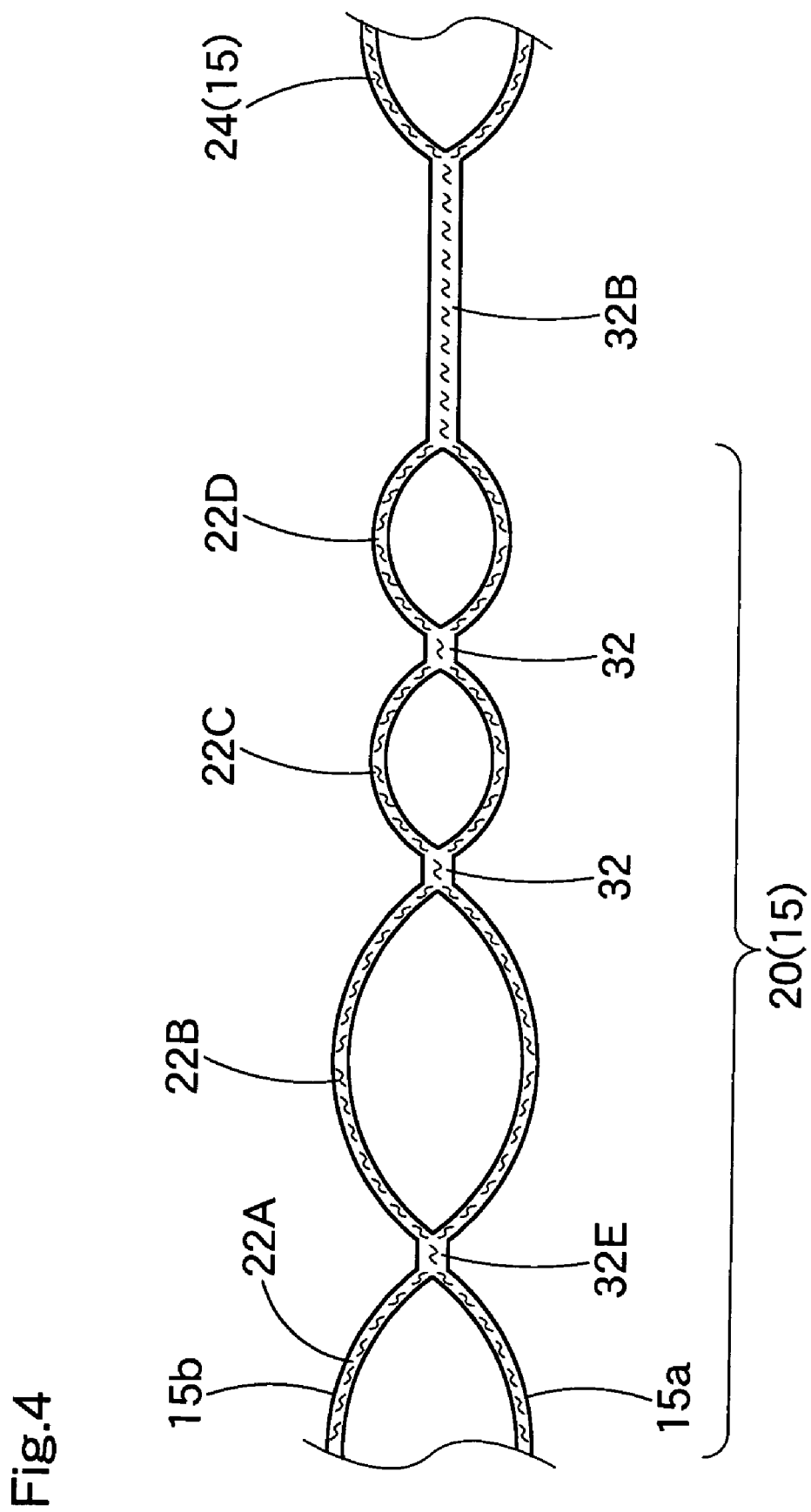
FIG. 4 is an enlarged section taken along line IV—IV of FIG. 3.
Figure 5:
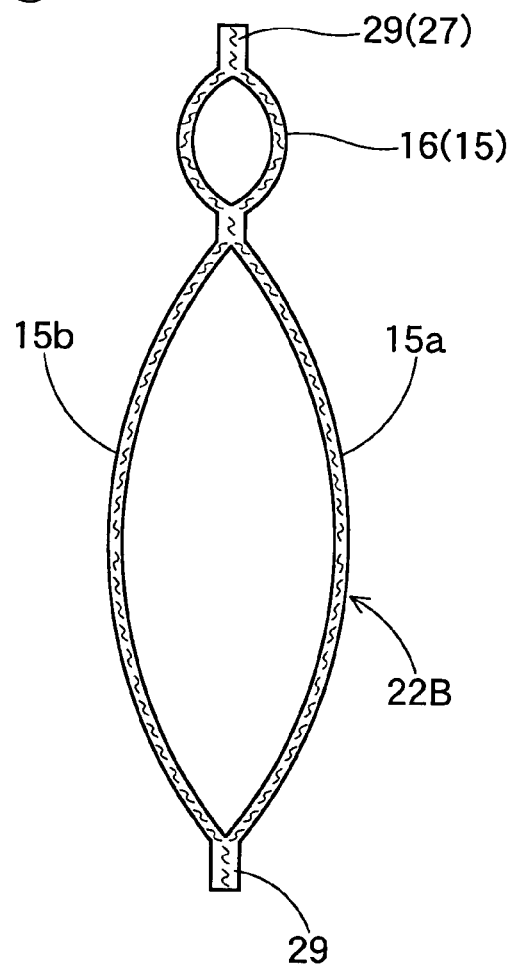
FIG. 5 is an enlarged section taken along line V—V of FIG. 3.

Referring to FIG. 3, the airbag 12 includes a flexible airbag body 13 and a flow regulating cloth 38.

The airbag body 13 is hollow-woven of polyamide yarns or the like. As shown in FIGS. 1 and 3, the airbag body 13 is expanded from folded state upon inflow of inflation gas G, and covers windows W1 and W2 located in front and rear of a first middle pillar P1, a window W3 between a second middle pillar P2 and a rear pillar RP, and the first and second middle pillars P1 and P2 inside the vehicle. The airbag body 13 includes a gas admissive portion 15 which admits inflation gas G inside to separate the vehicle's inner side wall 15a and the vehicle's outer wall 15b, and a non-admissive portion 27 which admits no inflation gas G.

In the foregoing embodiment, the gas admissive portion 15 includes a gas feed passage 16, a gas inlet port 17, and an inflatable shielding portion 19.

The gas feed passage 16 is disposed near the upper edge 13a of the airbag body 13 along the front-rear, or longitudinal, direction of the vehicle V1, over substantially entire length of the airbag body 13. The gas feed passage 16 is adapted to guide the inflation gas G discharged from the inflator 43 to the inflatable shielding portion 19 located below the gas feed passage 16. Substantially in the middle of the gas feed passage 16 in the front-rear direction, there is arranged a gas inlet port 17 connected to the inflator 43. the gas inlet port 17 is communicated with the gas feed passage 16, and is projected upward from the airbag body 13. In the foregoing embodiment, the gas inlet port 17 is opened at the rear end 17a. The gas inlet port 17 is mounted around a later-described diffuser 45 of the inflator 43 with the flow regulating cloth 38 interposed therebetween, thereby to be connected with the inflator 43. The gas inlet port 17 is connected to the diffuser 45 by means of a later-described clamp 50.

The inflatable shielding portion 19 includes a front-seat protecting portion 20 and a rear-seat protecting portion 21 disposed side by side along the front-rear direction of the vehicle, a plurality of vertical passages 24 disposed in both front and rear of each of the front-seat and rear-seat protection portions 20 and 21, and a communication passage 25 disposed along the lower edge 13b of the airbag body 13.

The front-seat and rear seat protecting portions 20 and 21 in the embodiment include a plurality of vertical inflatable portions 22 in their areas. The vertical inflatable portions 22 are juxtaposed along the front-rear direction of the vehicle V1 while being partitioned by later-described vertical partitions 32, and each of the vertical inflatable portions 22 is vertically arranged. The front-seat protecting portion 20 includes four vertical inflatable portions 22A, 22B, 22C and 22D. The rear-seat protection portion 21 includes two vertical inflatable portions 22E and 22F. The vertical inflatable portions 22C and 22D have smaller widths of front-rear direction than other vertical inflatable portions 22. These vertical inflatable portions 22C and 22D are to be located in the interior of the first middle pillar P1 when the airbag 12 is completely inflated. That is, the vertical inflatable portions 22C and 22D are so predetermined with smaller widths of front-rear direction as to be thinner than other vertical inflatable portions 22 at the completely inflated time, so that the vertical inflatable portions 22C and 22D are expanded swiftly with little interference with the pillar garnish 6 disposed on the vehicle's inner side of the first middle pillar P1.

Each of the vertical inflatable portions 22 is closed by later-described transverse partitions 33 at the upper end, and is communicated with the communication passage 25 at the lower end 22a. The inflation gas G flows into each of the vertical inflatable portions 22 from the communication passage 25.

The vertical passages 24 are located in both front and rear of each of the front-seat and rear-seat protection portions 20 and 21. In the foregoing embodiment, the vertical passages 24 are disposed at three positions: in front of the front-seat protecting portion 20; between the front-seat protecting portion 20 and the rear-seat protecting portion 21; and at the rearward of the rear-seat protecting portion 21. In other words, the front-seat and rear-seat protection portions 20 and 21 share the vertical passage 24 disposed between them in common. Each of the vertical passages 24 extends downward while being communicated with the gas feed passage 16 toward the upper end 24a. In the embodiment, each of the vertical passages 24 is vertically arranged with the lower end 24b communicated with the communication passage 25. In other words, each of the vertical passages 24 sends the inflation gas G from the gas feed passage 16 out to the communication passage 25.

The communication passage 25 is disposed near the lower edge 13b of the airbag body 13 along the front-rear direction of the vehicle V1, over substantially entire length of the airbag body 13. The communication passage 25 is communicated with the lower ends 24b of the vertical passages 24 and the lower ends 22a of the vertical inflatable portions 22 of the front and rear seat protection portions 20 and 21, and is adapted to guide the inflation gas G from the gas feed passage 16 via the vertical passages 24 into the front and rear protecting portions 20 and 21.

The non-admissive portion 27 is formed by joining the vehicle's inner side wall 15a and the vehicle's outer side wall 15b, and includes a plurality of mounting portions 28, a peripheral portion 29, a partitioning portion 31 and a panel portion 35.

The peripheral portion 29 is located around and neighbors the gas admissive portion 15, and is so densely formed as not to cause gas leakage.

The mounting portions 28 are formed, in the foregoing embodiment, at six positions in the upper edge 29a of the peripheral portion 29 and the upper edge of later-described triangular panel portions 32a and 32b of the panel portion 32 in the upper edge 13a of the airbag body 13, and are projected upward therefrom. Each of the mounting portions 28 is provided with a mounting hole 28a for a mounting bolt 41, and a mounting bracket 40 is attached thereto for attachment of the airbag body 13 to an inner panel 2 of a vehicle body 1. Each of the mounting portions 28 is secured to the inner panel 2 of sheet metal together with the mounting bracket 40 by means of the mounting bolt 41.

The panel portion 35 includes two triangular panel portions 35a and 35b located at the front and rear ends of the airbag body 13, respectively. The triangular panel portion 35a is projected forward from the front edge of the peripheral portion 29, and is provided at the front end with a mounting portion 28. The triangular panel portion 35b is projected rearward from the rear edge of the peripheral portion 29, and is provided at the front end or the upper edge with a mounting portion 28. In the embodiment, the individual triangular panel portions 35a and 35b are formed of woven fabric of polyester yarns or the like, separately from the airbag body 13, and are sewn to the front edge and the rear edge of the peripheral portion 29.

The partitioning portion 31 is located in the area of the inflatable shielding portion 19, and includes a plurality of vertical partitions 32 and transverse partitions 33. The vertical partitions 32 are juxtaposed along the front-rear direction in the areas of the front-seat and rear-seat protection portions 20 and 21 to partition the individual vertical inflatable portions 22. The vertical partition 32A in front of the vertical inflatable portion 22A and the vertical partition 32B in the rear of the vertical inflatable portion 22D partition the front-seat protection portion 20 and the vertical passages 24 in front and rear thereof. Likewise, the vertical partition 32C in front of the vertical inflatable portion 22E and the vertical partition 32D in the rear of the vertical inflatable portion 22F partition the rear-seat protection portion 21 and the vertical passages 24 in front and rear thereof. In the embodiment, the vertical partitions 32B and 32C take substantially rectangular shapes. Remaining vertical partitions 32 except the partitions 32B and 32C have rod shapes arranged vertically. Each of the vertical partitions 32A and 32E in front of the vertical inflatable portions 22A and 22B is provided at the lower end with projection(s) 32a projected in front-rear direction for narrowing the opening width toward the lower end 22a of the vertical inflatable portions 22A and 22B. In the embodiment, the vertical partition 32A is provided with a projection 32a projected rearward, while the vertical partition 32E is provided with two projections 32a and 32a projected in front and rear directions, respectively. The projections 32a prevent too much inflation gas G from the vertical passage 24 disposed in front of the vertical partition 32A from flowing into the vertical inflatable portions 22A and 22B, and help the gas G to flow into the communication passage 25.

The transverse partitions 33A and 33B are arranged along the front-rear direction to partition the gas feed passage 16 and the front-seat and rear-seat protection portions 20 and 21. In the embodiment, the transverse partition 33A joins the upper ends of the vertical partitions 32A and 32B, and closes the upper ends 22b side of the individual vertical inflatable portions 22A, 22B, 22C and 22D constituting the front-seat protection portion 20. The transverse partition 33B joins the upper ends of the vertical partitions 32C and 32D, and closes the upper ends 22b side of the individual vertical inflatable portions 22E and 22F constituting the rear-seat protection portion 21.

Figure 6:
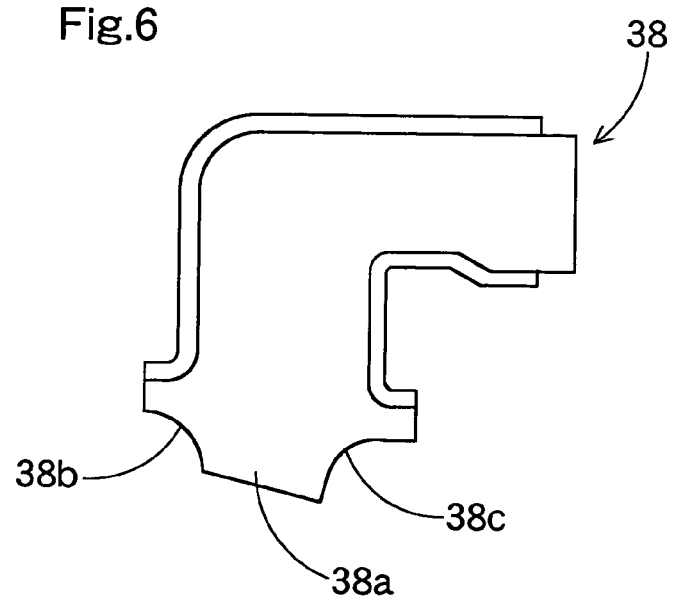
FIG. 6 is a front view of a flow regulating cloth used in the airbag of FIG. 3.

As shown in FIG. 3, the flow regulating cloth 38 in the foregoing embodiment is hollow-woven as the airbag body 13, and is mounted around the diffuser 45 of the inflator 43 inside the gas inlet port 17. Referring to FIG. 3 and also FIG. 6, the flow regulating cloth 38 is so bent that the leading end 38a side is located within the gas feed passage 16. At the leading end 38a of the flow regulating cloth 38, there are opened gas outlet ports 38b and 38c for emitting inflation gas, respectively toward the lower front and toward the lower rear.

Figure 2:
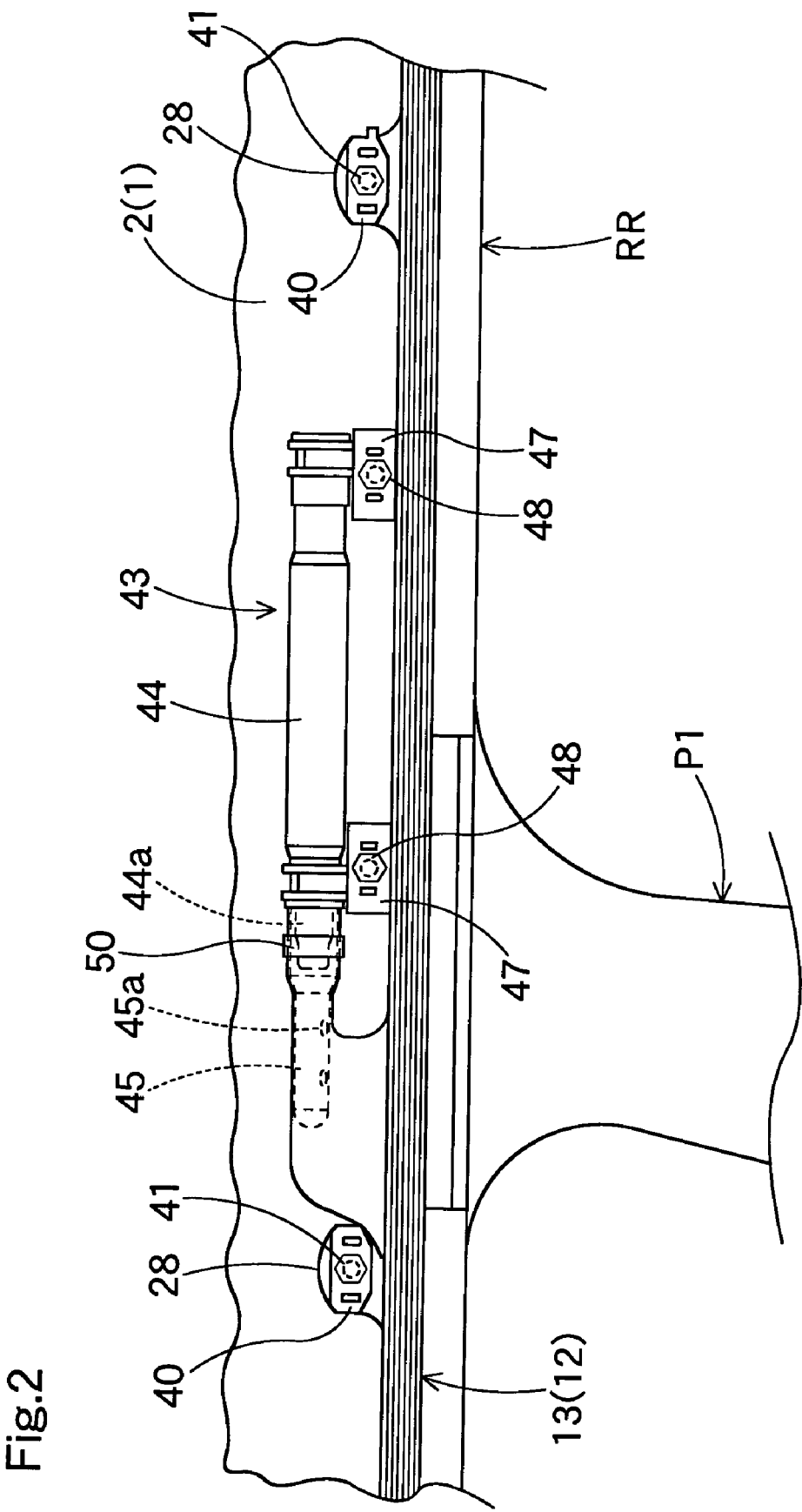
FIG. 2 is a partial enlarged section of an arrangement position of an inflator in the airbag device of FIG. 1.

Referring back to FIGS. 1 and 2, the inflator 43 includes a main body 44 for supplying inflation gas G to the folded airbag 12, and a diffuser 45 for guiding the inflation gas G discharged from the main body 44.

The main body 44 has an approximately cylindrical shape, and includes a head portion 44a at the leading end. The head portion 44a is provided with not-shown gas discharge ports.

The diffuser 45 is formed of a metal pipe material having an approximately cylindrical shape closed at the leading end, and is fitted around the top end of the main body 44 at the root side, thus covering the head 44a. The diffuser 45 is provided at lower surface toward the leading end with two gas discharge ports 45a juxtaposed along front-rear direction of the vehicle V. The diffuser 45 is sheathed with the flow regulating cloth 38 and the gas inlet port 17 of the airbag body 13, and is connected to the airbag 12 by means of a cramp 50 mounted around the rear end 17a of the gas inlet port 17.

The inflator 43, with the diffuser 45 fitted at the leading end of the main body 44, is attached to the inner panel 2 of the body 1 along the front-rear direction of the vehicle V1, by means of a mounting bracket 47 and a mounting bolt 48.

Mounting of the head protecting airbag device M1 on the vehicle V1 is now described. Firstly, the flow regulating cloth 38 is inserted into the gas inlet port 17 of the airbag body 13, so that the airbag 12 is formed. Then the airbag 12 is folded. More specifically, the airbag body 13 is folded up from flat expanded state, in a bellows fashion subsequently on crest and valley folds C1 (referring to single-dotted lines in FIG. 3), so that the lower edge 13b of the body 13 is brought close to the upper edge 13a. Then the folded airbag body 13 is wrapped up at predetermined positions by a not-shown breakable wrapping member for keeping the folded-up configuration. Thereafter, the mounting brackets 40 are fixed to the individual mounting portions 28. The cramp 50 is mounted on the gas inlet port 17, and the mounting bracket 47 is attached to the inflator 43.

Then the gas inlet port 17 of the airbag body 13 with the cramp 50 is mounted around the diffuser 45 of the inflator 43 while interposing the flow regulating cloth 38 in between. Then the cramp 50 is fastened to join the diffuser 45 and the airbag 12. Thus the airbag module is assembled.

Thereafter, the individual mounting brackets 40 and 47 are secured to predetermined positions of the inner panel 2 by the bolts 41 and 48, so that the airbag module is mounted on the body 1. Subsequently, a not-shown lead wire leading from a predetermined control device for actuating the inflator is connected to the inflator 43. If the pillar garnish 4, the roof head lining 5, and further the pillar garnishes 6, 7 and 8 are attached on the body 1, the airbag device M1 is mounted on the vehicle V1.

When the inflator 43 is actuated after the airbag device M1 is mounted on the vehicle V1, the inflation gas G from the inflator 43 flows into the gas feed passage 16 via the gas inlet port 17, as shown by double-dotted lines in FIG. 3. The inflation gas G subsequently flows downward along the individual vertical passages 24 from the gas feed passage 16, then the inflatable shielding portion 19 starts to inflate while being unfolded. The airbag body 13 then breaks the wrapping member, pushes and opens the airbag cover 10 in the lower edges of the pillar garnish 4 and the roof head lining 5, and protrudes downward to cover the vehicle's inner side of the windows W1, W2 and W3 and the middle pillars P1 and P2, as indicated by double-dotted lines in FIG. 1, while expanding and inflating.

In the head protecting airbag device M1 in the first embodiment according to the present invention, the vertical passages 24 are located in the front and rear of the front-seat and rear-seat protection portions 20 and 21 in the airbag 12 for sending the inflation gas G from the gas feed passage 16 out to the front-seat and rear-seat protection portions 20 and 21. The vertical passages 24 extend downward with the upper ends 24a side communicated with the gas feed passage 16. In this relation, in the initial stage of inflation of the airbag 12, the vertical passages 24 are unfolded with the inflation gas G from the gas feed passage 16, and extend downward firstly. Then the front-seat and rear-seat protection portions 20 and 21 disposed between the vertical passages 24 are unfolded and expand along with unfolding of the vertical passages 24, in a thin condition admitting as little inflation gas as possible. Accordingly, even if a space between the windows W1 and W2 and occupants' heads is narrow, the individual front-seat and rear-seat protection portions 20 and 21 are able to expand therein quickly, and protect the occupants' heads properly with subsequent inflation.

In the head protecting airbag device M1, therefore, even if the airbag 12 includes a plurality of protection portions 20 and 21, the individual protection portions 20 and 21 are expanded smoothly in a space between the windows W1 and W2 and occupants' heads, and the occupants' heads are protected properly with subsequent inflation of the airbag 12.

Moreover in the head protecting airbag device M1, the communication passage 25 is located along the lower edge 13b of the airbag body 13 in the front-rear direction. The inflation gas G flowing into the gas feed passage 16 firstly flows through the vertical passages 24, the communication passage 25, and further into the front-seat and rear-seat protection portions 20 and 21.

Figure 7A:
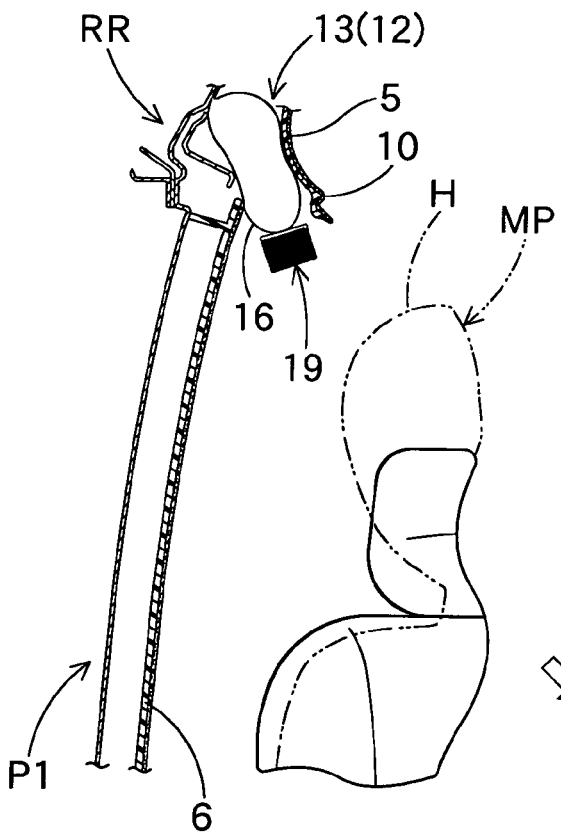
FIG. 7 shows schematic sections illustrating deployment of the airbag of FIG. 3.
Figure 7B:
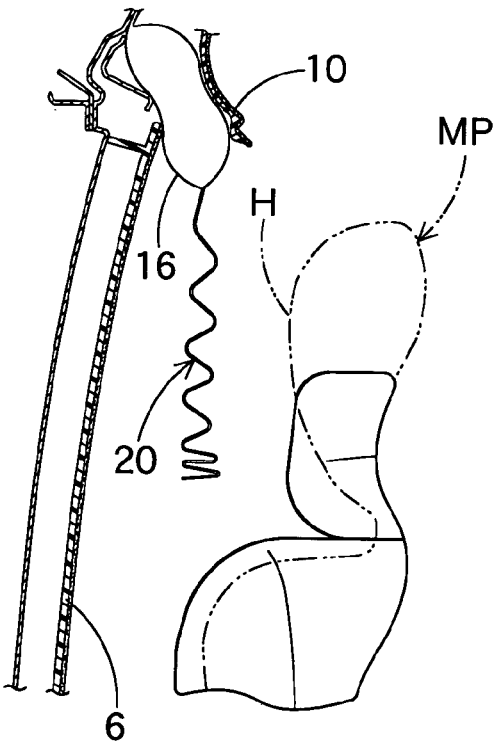
Figure 7C:
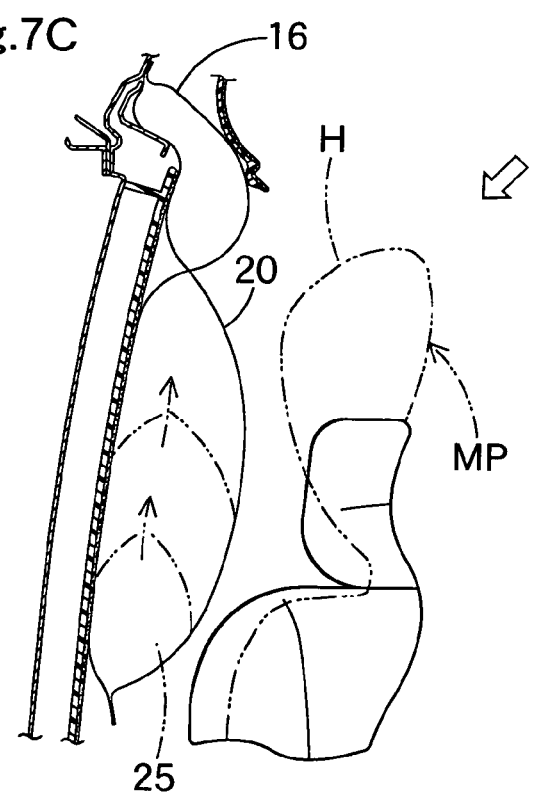

With this construction, as shown in FIGS. 7A and 7B, when the front-seat and rear-seat protection portions 20 and 21 expand along with unfolding of the vertical passages 24, the protection portions 20 and 21 expand in further uninflated condition. As referred to double-dotted line in FIG. 7C, subsequently, the protection portions 20 and 21 inflate from lower parts with inflation gas from the communication passage 25. Meanwhile, since the communication passage 25 is located in the front-rear direction along the lower edges of the protection portions 20 and 21, the lower edges of the protection portions 20 and 21 disposed between the vertical passages 24 are securely expanded over the entire area. Accordingly, as shown by double-dotted lines in FIGS. 7A, 7B and 7C, even in cases in which the heads H of vehicle occupants MP are approximate to the windows W, or the middle pillars P1 and P2, the front-seat and rear-seat protection portions 20 and 21 are securely expanded between the windows W (or the middle pillars P1 and P2) and the heads H of occupants MP. Without considering this point, of course, the protection portions may be so configured as to be communicated with the vertical passages at vertically middle positions of the vertical passages, as in a head protecting airbag device M2 in later-described second embodiment.

In the airbag 12 in the foregoing embodiment, moreover, a plurality of vertical inflatable portions 22 are juxtaposed in the front-seat and rear-seat protection portions 20 and 21. Since each of the individual vertical inflatable portions 22 constituting the front-seat and rear-seat protection portions 20 and 21 inflates by admitting inflation gas from the lower end 22a, each of the protection portions 20 and 21 is expanded in an even thinner, uninflated condition substantially over the entire area when expanding along with unfolding of the vertical passages 24. In the airbag 12, furthermore, since each of the vertical inflatable portions 22 inflates with inflation gas while reducing the width in the front-rear direction, there is exerted a tension along the vehicle's front-rear direction in the lower edges of the front-seat and rear-seat protection portions 20 and 21 upon completion of inflation of the airbag 12. Especially in a front-seat part of the vehicle to be covered by the front-seat protection portion 20, the front pillar FP is arranged obliquely relative to the first middle pillar P1. Accordingly, an opening area of the window W1 is greater than an opening area of the window W2 at the side of the rear seat. With the configuration of juxtaposing the vertical inflatable portions 22 in the front-seat protection portion 20, however, since a tension along the vehicle's front-rear direction is exerted in the lower edge of the front-seat protection portion 20 upon completion of inflation of the airbag 12, the front-seat protection portion 20 completely inflated is able to protect an occupant seated in the front seat properly by preventing the occupant from moving outward of the vehicle. Of course, without considering this point, the protection portions may be provided in their areas with a plurality of transverse inflatable portions arranged along the front-rear direction and juxtaposed vertically, as in the head protecting airbag device M2 in later-described second embodiment.

Here in the head protecting airbag device M1 in the foregoing embodiment, the airbag 12 includes two protecting portions of the front-seat and rear-seat protection portions 20 and 21. However, the number of protection portions should not be limited to this, but the airbag may be configured to include more than two protection portions according to the vehicle's shape to which the airbag device is to be mounted. In the head protecting airbag device M1, moreover, the airbag 12 is configured such that the front-seat protection portion 20 and the rear-seat protection portion 21 share a vertical passage 24 located therebetween in common. However, it will also be appreciated that the rear-seat protection portion could be provided in front thereof with another vertical passage separate from the vertical passage disposed rearward of the front-seat protection portion.

Figure 8:
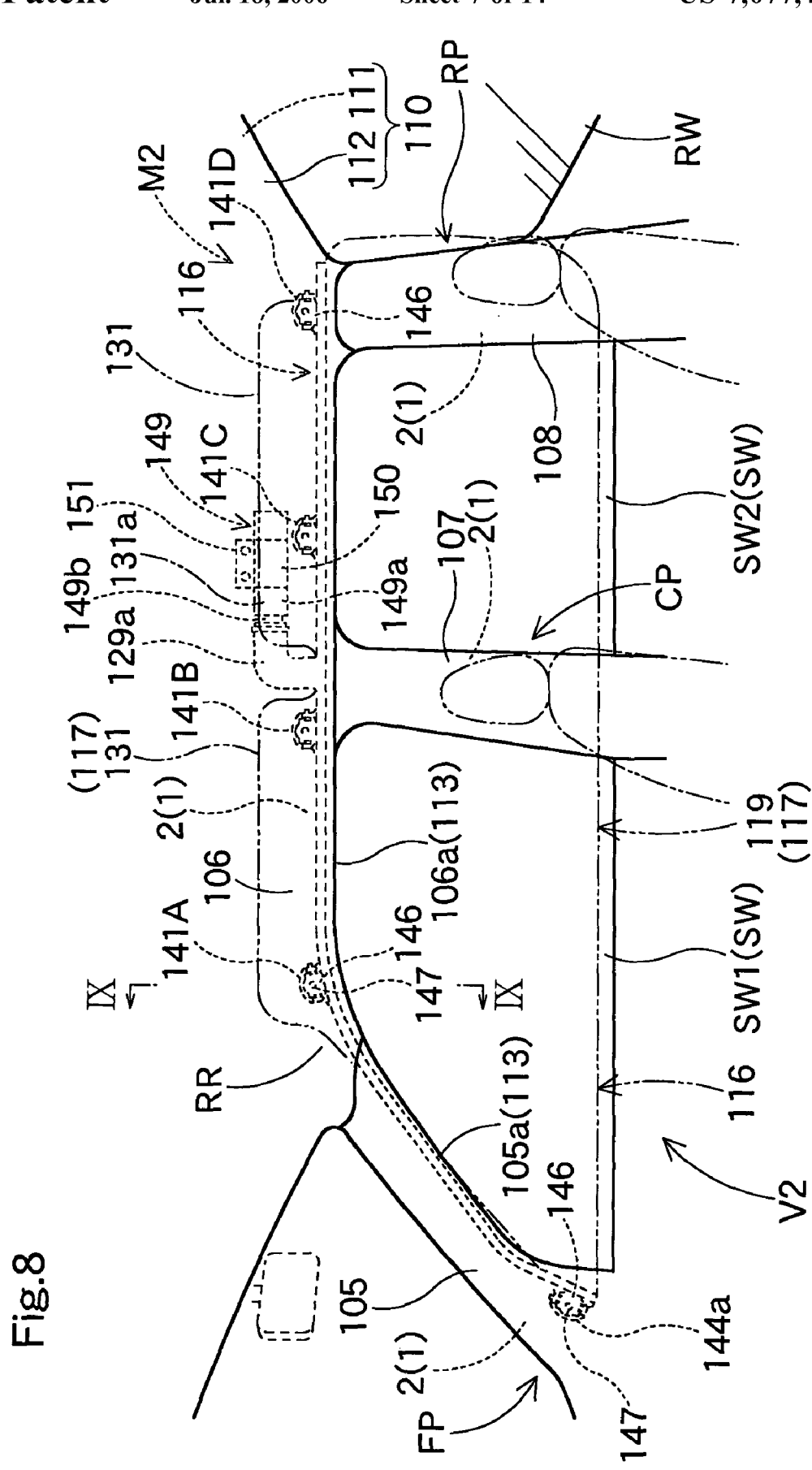
FIG. 8 is a schematic front view of a second embodiment of the head protecting airbag device according to the present invention upon airbag deployment, as viewed from the vehicle's inner side.

Now, FIG. 8 illustrates a second embodiment of the head protecting airbag device to achieve the first and second objects of the present invention. The head protecting airbag device M2 is mountable on a double-cab vehicle V2, and includes an airbag 116, an inflator 149 and an airbag cover 113.

The double-cab vehicle V2 includes: a window SW (SW1 and SW2) as a side window disposed respectively at the side of front seat and rear seat in which occupants are seated and disposed at the vehicular side face; and a rear wall 110 disposed rearward of the window SW2 and substantially perpendicularly to the window SW2. The double-cab vehicle V2 further includes: a front pillar FP extending obliquely downward from the roof side rail RR in front of the window SW1 to neighbor the window SW1, and arranged substantially vertically; a center pillar CP extending downward from the roof side rail RR between the window SW1 and the window SW2; and a rear pillar RP extending downward from the roof side rail RR between the window SW2 and the rear wall 110 to neighbor the window SW2. In the foregoing embodiment, the window SW1 is located at the side of front seat, and is a window of front door. The window SW2 is located at the side of rear seat, and is a window of rear door.

In the vehicle's inner side of each of the pillars FP, CP and RP, there are arranged garnishes 105, 107 and 108 of synthetic resin for covering the inner panel 2 of the vehicular body 1 made of a sheet metal. On the roof side rail RR, too, there is arranged a roof head lining 106 of synthetic resin for covering the inner panel 2 at the vehicle's inner side.

Referring to FIG. 8, the rear wall 110 includes a rear panel 111 of the vehicular body 1 of a sheet metal and a rear trim 112 of synthetic resin for covering the vehicle's inner side of the rear panel 111, while having a rear window RW at the upper side. The upper end part of the rear wall 110 is covered by the roof head lining 106 extended from the ceiling.

Figure 13:
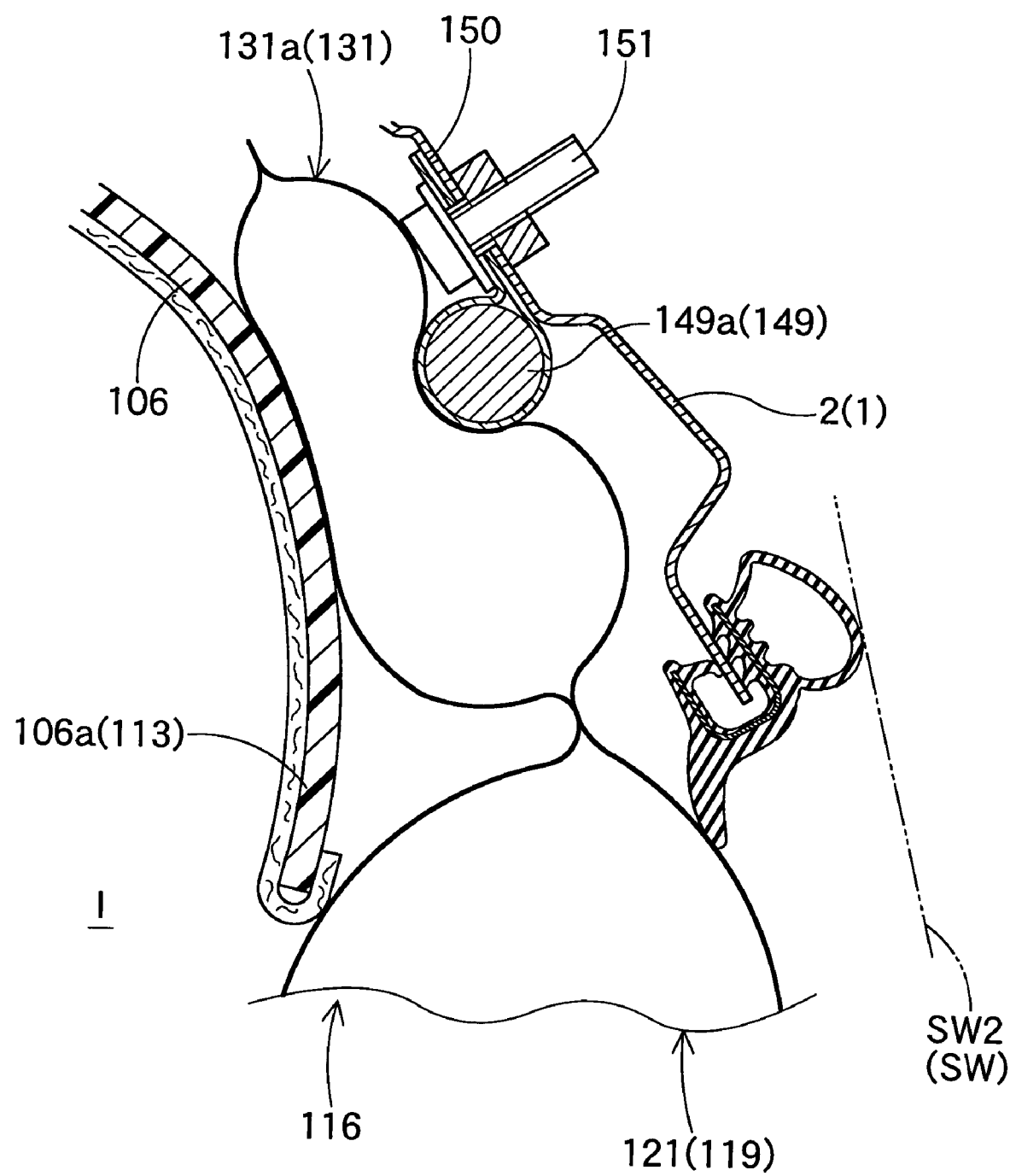
FIG. 13 is a schematic section of the airbag of FIG. 8 upon deployment.

In the foregoing embodiment, the airbag cover 113 is composed of the lower edges 105a and 106a of a front pillar garnish 105 and the roof head lining 106. The airbag cover 113 is adapted to cover the vehicle's inner side I of the airbag 116 folded and housed, and is configured to open toward the vehicle's inner side I by the push of a window-ward shielding portion (inflatable shielding portion) 119 of the airbag 116 for allowing the window-ward shielding portion 119 expanding and inflating to protrude toward the vehicle's inner side I, as indicated by double-dotted lines in FIG. 9 and as shown in FIG. 13.

Figure 9:
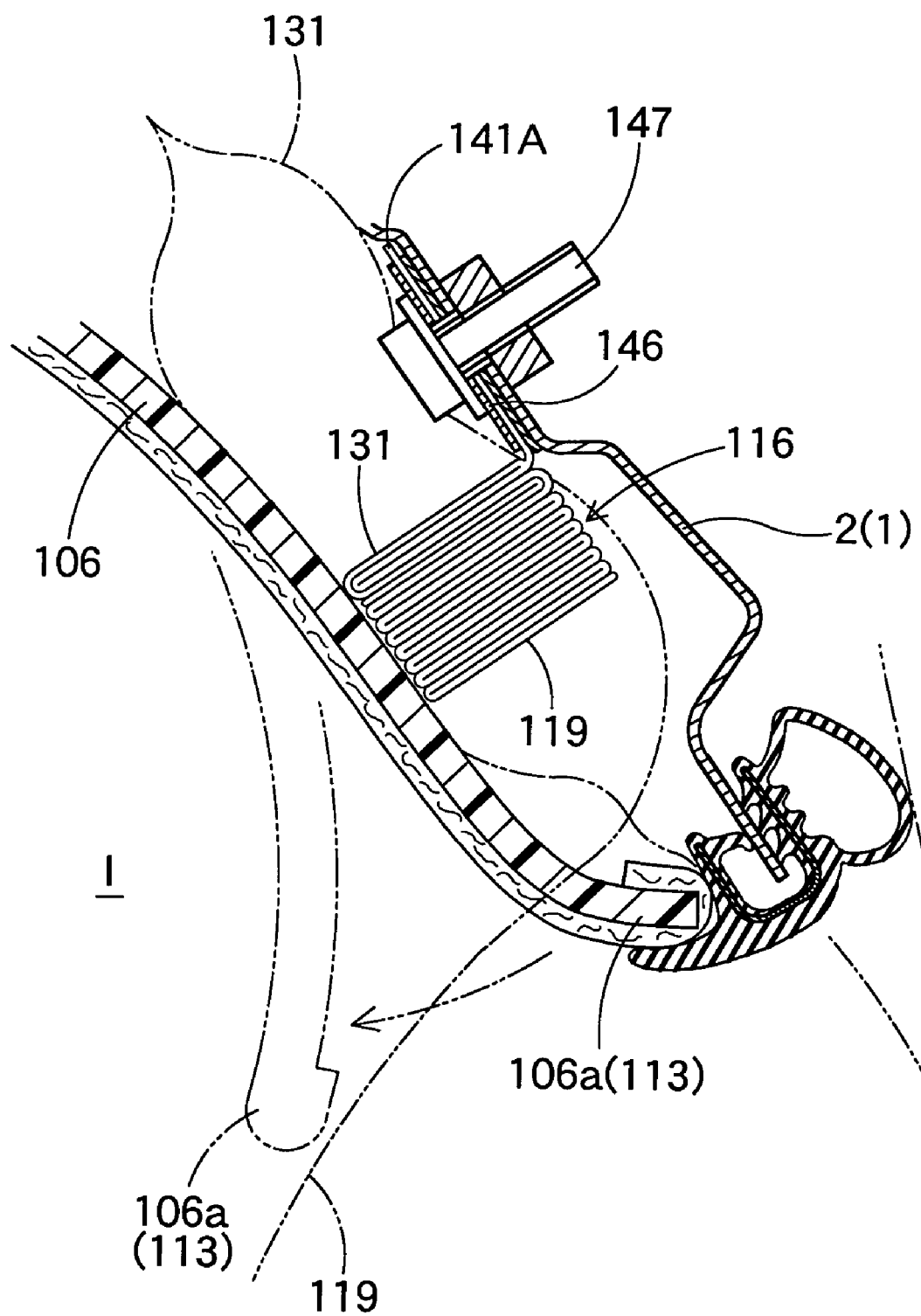
FIG. 9 is a schematic enlarged section taken along line IX—IX of FIG. 8.

Referring to FIGS. 8 and 9, the airbag 116 is folded and housed in the upper edge side of the window SW (SW1 and SW2) at the vehicle's inner side I passing over the center pillar CP. The airbag 116 is hollow-woven of polyamide yarns, polyester yarns or the like. The airbag 116 includes: a gas admissive portion 117 which admits inflation gas G from the inflator 149 to inflate separating a vehicle's inner side wall 117a and a vehicle's outer side wall 117b; and a non-admissive portion 135 which admits no inflation gas.

The gas admissive portion 117 includes a window-ward shielding portion 119 as an inflatable shielding portion to cover the vehicle's inner side I of the windows SW1, SW2, the center pillar CP and the rear pillar RP upon deployment, and a roof-ward shielding portion 131 to cover the vehicle's inner side I of the inner panel 2 of the body 1 in the roof side rail RR, and a gas feed passage 129 for feeding the window-ward shielding portion 119 and the roof-ward shielding portion 131 with inflation gas.

The gas feed passage 129 extends in front-rear direction between the window-ward shielding portion 119 and the roof-ward shielding portion 131. Substantially in the middle of the gas feed passage 129 in front-rear direction, there is arranged a joint port 129a. The joint port 129a is projected upward in a cylindrical shape, and is opened rearward to be connected to the inflator 149.

Figure 10:
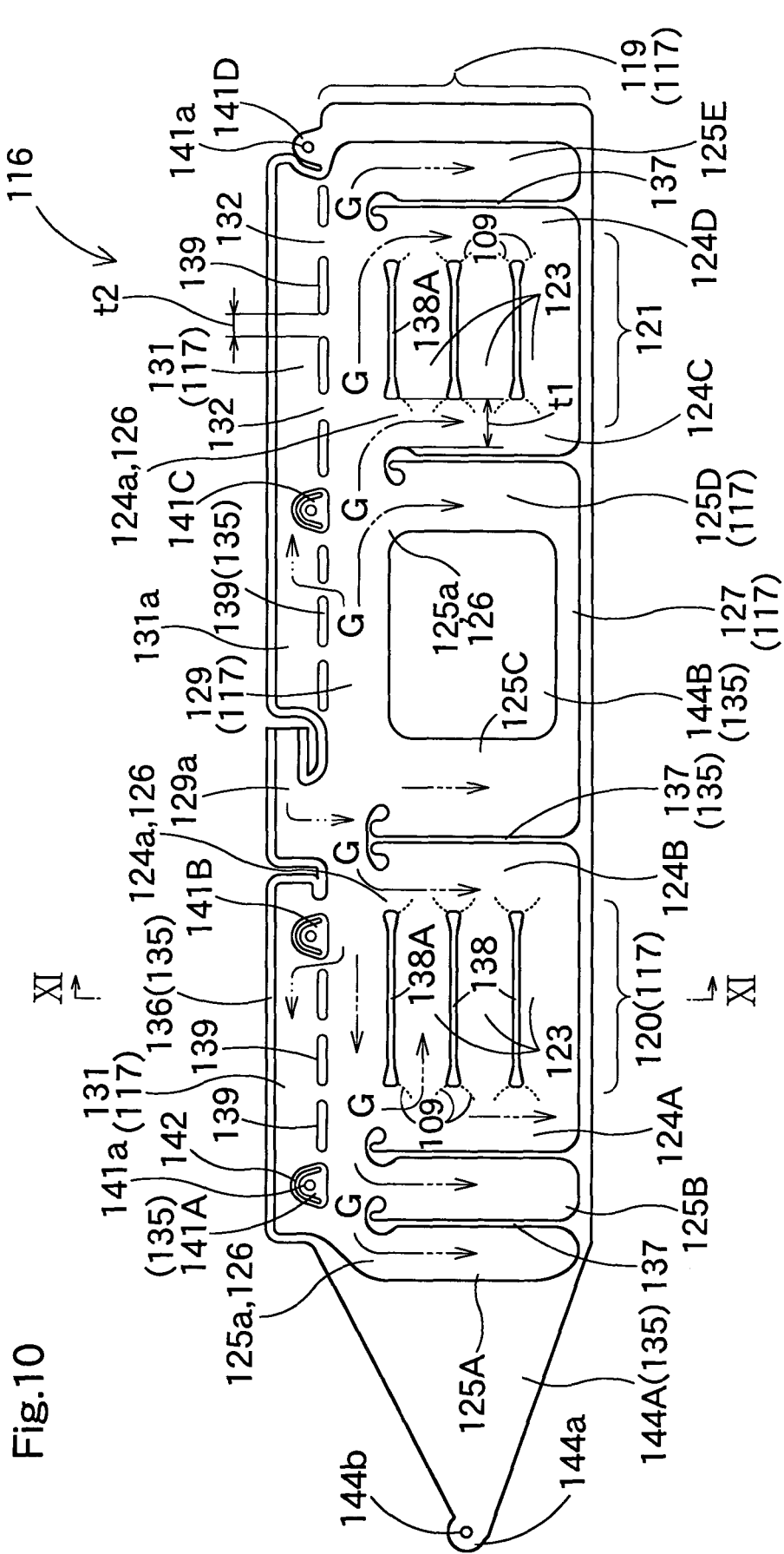
FIG. 10 is a front view of an airbag used in the airbag device of FIG. 8 flatly expanded.
Figure 11:
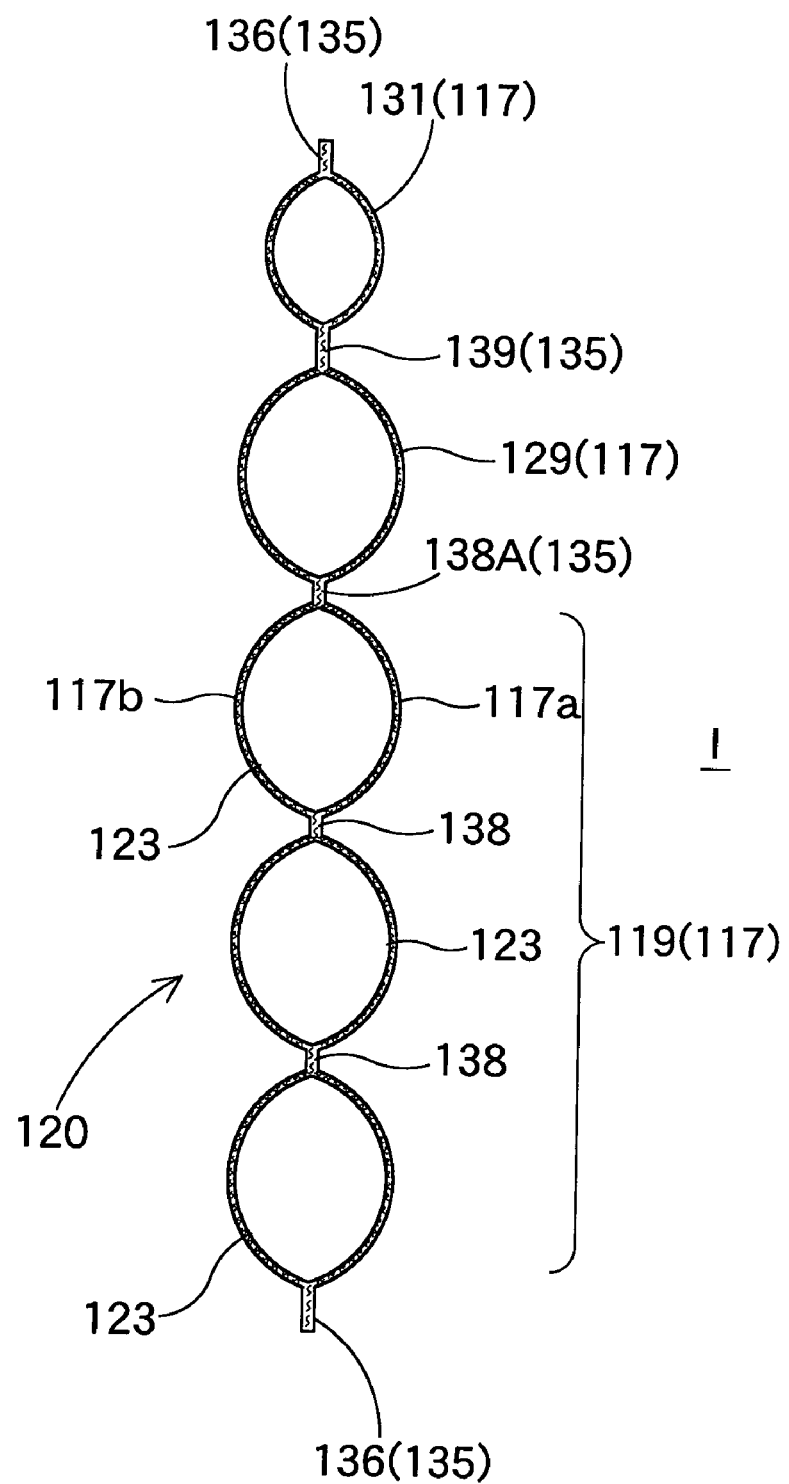
FIG. 11 is a sectional view taken along line XI—XI of FIG. 10.
Figure 12:
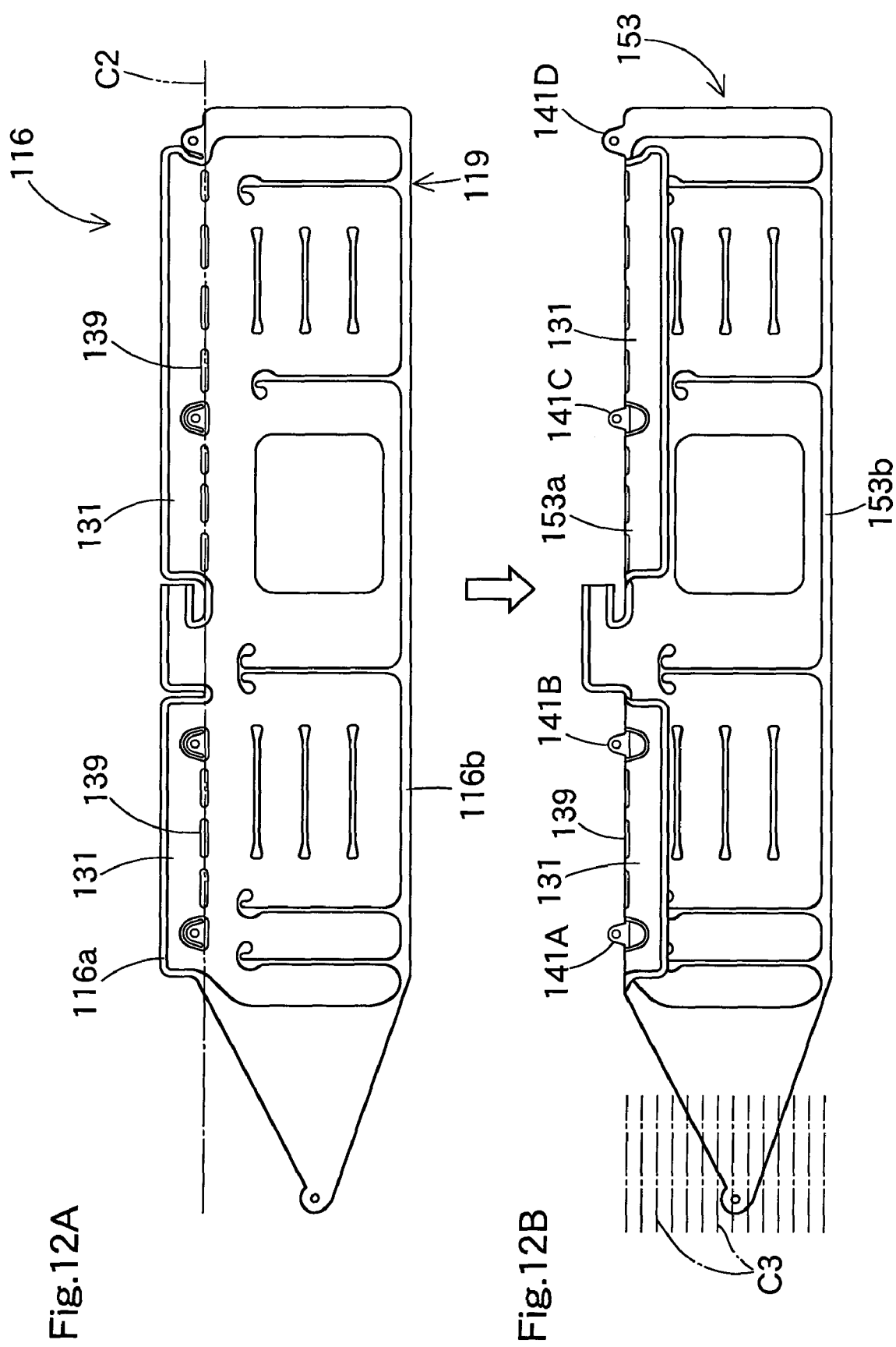
FIG. 12 illustrates a folding process of the airbag of FIG. 10.

Referring to FIGS. 10 and 12A, the window-ward shielding portion 119 is located below the gas feed passage 129, and includes a front-seat protecting portion 120 and a rear-seat protecting portion 121 disposed side by side in the front-rear direction of the vehicle, a plurality of vertical passages 124 disposed in both front and rear of each of the front-seat and rear-seat protection portions 120 and 121, and a vertical inflatable portion 125 neighboring the vertical passages 124, and a communication passage 127 disposed along the lower edge 116b of the airbag 116.

Each of the front-seat and rear-seat protecting portions 120 and 121 include a plurality of (three, in the foregoing embodiment) transverse inflatable portions 123 in their areas. The transverse inflatable portions 123 are juxtaposed along the vertical direction, while being partitioned by later-described partitions 138, and each of the transverse inflatable portions 123 is arranged along the front-rear direction of the vehicle. Each of the transverse inflatable portions 123 is communicated at front and rear ends with the vertical passages 124, and the inflation gas G flows into each of the transverse inflatable portions 123 from the vertical passages 124. In other words, each of the front-seat and rear-seat protecting portions 120 and 121 admits the inflation gas G through the vertical passages 124.

The vertical inflatable portion 125 is disposed vertically in the front and rear of each of the vertical passages 124, while being partitioned by later-described partitions 137, and neighbors each of the vertical passages 124. In the embodiment, two vertical inflatable portions 125A and 125B are arranged in front of the vertical passage 124A disposed in front of the front-seat protecting portion 120. There are arranged each one vertical inflatable portions 125C, 125D and 125E, respectively, in the rear of the vertical passage 124B disposed in the rear of the front-seat protecting portion 120, and in the front and rear of the vertical passages 124C and 124D disposed in the front and rear of the rear-seat protecting portion 121.

Each of the vertical passages 124 and the vertical inflatable portions 125 are arranged vertically while being communicated at upper ends 124a and 125a with the gas feed passage 129. The vertical inflatable portions 125C and 125D are communicated with the communication passage 127 at lower ends. The vertical inflatable portions 125A, 125B and 125E are closed at lower ends. In other words, the upper ends 124a and 125a of each of the vertical passage 124 and the vertical inflatable portion 125 both of which are opened toward the gas feed passage 129 function as inlet ports 126, and thereby the window-ward inflatable portion 119 as an inflatable shielding portion admits the inflation gas G from the gas feed passage 129.

Each of the front-seat and rear-seat protection portions 120 and 121 is adapted to cover the vehicle's inner side of the windows SW1 and SW2 upon deployment of the airbag 116, and is expected to protect vehicle occupants upon such cases as side impact collision. With the foregoing configuration of arranging a plurality of transverse inflatable portions 123 along the front-rear direction in each of the front-seat and rear-seat protection portions 120 and 121, even if the vehicle interferes with such a vertically long object as a telegraph pole upon side impact collision, the transverse inflatable portions 123 vertically juxtaposed come to encounter the object substantially perpendicularly, so that the object is prevented from entering toward the occupants, and the occupants are properly protected. Also with this configuration, the transverse inflatable portions 123 disposed in the area of the gas admissive portion 117 help prevent the airbag 116 upon inflation from shrinking in the vehicle's front-rear direction. At completely inflated time, accordingly, it is possible to keep the volume of the airbag 116 as small as possible while securing the length in the front-rear direction of each of the front-seat and rear-seat protection portions 120 and 121.

Moreover, since the front-seat and rear-seat protection portions 120 and 121 are composed of the transverse inflatable portions 123, even if the heads of occupants shift in the front-rear direction by seats' sliding, energy absorbing property of front-seat and rear-seat protection portions 120 and 121, which are positioned at the side of the heads, does not vary so much.

When the airbag 116 is completely inflated, as shown in FIG. 10, there are likely to occur wrinkles 109 toward the center of the vertical passages 124 between the transverse inflatable portions 123 and each of the vertical passages 124. The wrinkles 109 are likely to hinder shape retention of the vertical passages 124 in the vertical direction. In the second embodiment, however, the vertical inflatable portions 125 are disposed in the front and rear of each of the vertical passages 124, and the wrinkles 109 do not occur in the vertical inflatable portion 125. In other words, the vertical inflatable portions 125 exert high shape retention property in the vertical direction. Accordingly, the front-seat and rear-seat protection portions 120 and 121 located between the vertical inflatable portions 125 are not easily bent and are able to protect the occupants' heads properly, even if pushed and moved outward by the occupants.

The communication passage 127 is communicated with the lower end of the vertical inflatable portion 125C disposed rearward of the front-seat protection portion 120, and the lower end of the vertical inflatable portion 125D disposed in front of the rear-seat protection portion 121.

The roof-ward shielding portion 131 is arranged above the gas feed passage 129 all along a length of the window-ward shielding portion 119, except a part for disposing the joint port 129a. The roof-ward shielding portion 131 and the gas feed passage 129 are partitioned by later-described partitions 139 provided intermittently. In other words, the roof-ward shielding portion 131 admits the inflation gas G via apertures between the individual partitions 139, which constitute inlet ports 132, from the gas feed passage 129. As shown in FIGS. 9 and 13, the roof-ward shielding portion 131 deploys upward and enters between the roof head lining 106 in the roof side rail RR and the inner panel 2 upon deployment of the airbag 116. Referring to FIGS. 10 and 13, the part of the roof-ward shielding portion 131 located rearward of the joint port 129a is adapted to cover the vehicle's inner side I of the inflator 149 when the airbag 116 is completely inflated. This part will be called a cover portion 131a herein below.

In the gas feed passage 129, as shown in FIG. 10, the smallest opening width t1 of the inlet ports 126 toward the window-ward shielding portion 119 is predetermined greater than the greatest opening width t2 of the inlet ports 132 toward the roof-ward shielding portion 131. Accordingly, the window-ward shielding portion 119 inflates with the inflation gas G prior to the roof-ward shielding portion 131. In other words, in the airbag 116, the window-ward shielding portion 119 is positioned upstream than the roof-ward shielding portion 131 in the flow of inflation gas G. In the foregoing embodiment, the greatest opening width t2 of the inlet ports 132 is less than half (more desirably, less than one third) of the smallest opening width t1 of the inlet ports 126.

The non-admissive portion 135 includes a peripheral portion 136 located around the gas admissive portion 117, a plurality of mounting portions 141, and a panel portion 143. The non-admissive portion 135 further includes partitions 137, 138 and 139 each of which is disposed in the area of the gas admissive portion 117.

The partitions 137 are disposed in plurality (five, in the foregoing embodiment) in the area of the window-ward shielding portion 119 for partitioning the vertical passages 124 and the vertical inflatable portions 125 in the front-rear direction. Each of the partitions 137 extends upward from the peripheral portion 136 in the lower edge 116a of the airbag 116. Portions partitioned by the upper ends of the partitions 137 in the window-ward shielding portion 119 function as inlet ports 126 for allowing the inflation gas G from the gas feed passage 129 to flow into the window-ward shielding portion 119.

The partitions 138 are disposed in plurality (three each in the foregoing embodiment) in each area of the front-seat and rear-seat protection portions 120 and 121 for partitioning the transverse inflatable portions 123 in the vertical direction. In FIG. 10, the uppermost partition 138A partitions the gas feed passage 129 and the front-seat and rear-seat protection portions 120 and 121.

The partitions 139 are arranged between the gas feed passage 129 and the roof-ward shielding portion 131, intermittently along the front-rear direction. The apertures between the partitions 139 constitute the inlet ports 132 for allowing the inflation gas G from the gas feed passage 129 to flow into the roof-ward shielding portion 131.

The mounting portions 141 are arranged in plurality (four, in the foregoing embodiment) in the area of the roof-ward shielding portion 131, and project upward from the upper edge side of the window-ward shielding portion 119 (the upper side of the gas feed passage 129). Each of the mounting portions 141 is provided with amounting hole 141a for inserting amounting bolt 147 shown in FIGS. 8 and 9. Each of the three mounting portions 141A, 141B and 141C except the rear most mounting portion 141D has a flap shape separable at the upper edge from the roof-ward shielding portion 131 by forming a slit 142 around the upper edge. Each of the slits 142 is formed in a substantially semi-arcuate shape, and has a peripheral portion 136 therearound. As shown in FIGS. 8 and 9, each of the mounting portions 141 is coupled with a mounting bracket 148 of sheet metal, and is secured to the inner panel 2 of the body 1 by means of the bolt 147.

The panel portion 144 is adapted to define the entire shape of the airbag 116, and helps shorten the time for deployment of the airbag 116 by reducing the capacity of the gas admissive portion 117. In the foregoing embodiment, the panel portion 144 includes a triangular panel portion 144A located at front end of the airbag 116, and a rectangular panel portion 144B located in a portion defined by the vertical inflatable portions 125C and 125D, and the gas feed passage 129 and the communication passage 127.

The panel portion 144A has a substantially triangular panel shape extending forward from the front end of the airbag 116, and is provided at the front end with a mounting portion 144a. As the mounting portions 141, the mounting portion 144a is also provided with a mounting hole 144b, and is secured to the inner panel 2 of the body 1 by means of a mounting bracket 148 and a mounting bolt 147.

Referring again to FIG. 8, the inflator 149 includes a substantially cylindrical main body 149a and a feed pipe 149b for introducing inflation gas from the main body 149a into the airbag 116. The inflator 149 is sheathed at the leading end of the feed pipe 149b with the joint port 129a of the gas feed passage 129 in the airbag 116, and thus is connected to the airbag 116 by means of a cramp (reference numeral omitted).

The inflator 149, as shown in FIGS. 8 and 13, is secured to the inner panel 2 in the roof side rail RR above the center pillar CP, by means of a bracket 150 and a bolt 151, while being covered at the vehicle's inner side I by the lower edge 106a of the roof head lining 106.

To mount the head protecting airbag device M2 on the vehicle V2, the airbag 116 is folded firstly. Referring to FIGS. 12A and 12B, more specifically, the roof-ward shielding portion 131 in the flatly expanded airbag 116 is folded back toward the lower edge 116b of the airbag 116 on a fold C2 or on the partitions 139. Then the roof-ward shielding portion 131 comes to be positioned inward of the windowward shielding portion 119, while each of the mounting portions 141 projects upward from the folding position. Thereafter, the folded-back airbag 153 is so bellows-folded on numbers of folds C3 extending along the front-rear direction as to bring the lower edge 153b close to the upper edge 153a. After folding, the folded airbag 116 is wrapped at predetermined positions by a not-shown breakable wrapping member for keeping the folded-up shape.

Thereafter, the mounting brackets 146 are attached to the mounting portions 141 and 144a. The inflator 149 is connected with the joint port 129a utilizing a cramp, and the mounting bracket 150 is mounted therearound. Thus the inflator 149 is connected with the airbag 116, thereby forming an airbag module.

Subsequently by securing the mounting portions 141, 144a and the inflator 149 to the inner panel 2 with the mounting bolts 147 and 151, the airbag module is mounted on the body 1 of the vehicle V2.

Then a lead wire leading from the inflator 149 is connected to a predetermined airbag actuating circuit. By further attaching the front pillar garnish 105 on the inner panel 2 at the front pillar FP, the roof head lining 106 on the inner panel 2 at the roof side rail RR, and the garnishes 107 and 108 on the inner panel 2 of the body 1 at the center pillar CP and the rear pillar RP, the head protecting airbag device M2 is mounted on the vehicle V2.

When the inflator 149 is actuated thereafter, the inflation gas G flows into the gas feed passage 129 through the joint port 129a, and the wrapping member is broken. Then the window-ward shielding portion 119 admits the inflation gas G, and pushes open the lower edges 105a and 106a of each of the front pillar garnish 105 and the roof head lining 106 as the airbag cover 113 toward the vehicle's inner side I, thereby protruding downward from the upper edges of the windows SW1 and SW2. Subsequently the roof-ward shielding portion 131 admits the inflation gas G, and deploys upward to go in between the inner panel 2 at the roof side rail RR and the roof head lining 106. Consequently, the airbag 116 covers the vehicle's inner side of the windows SW1, SW2, the center pillar CP, the rear pillar RP, and the vehicle's inner side of the inner panel 2 at the roof side rail RR.

In the head protecting airbag device M2, the vertical passages 124 are located in the front and rear of each of the protection portions 120 and 121 for supplying the inflation gas G from the gas feed passage 129 of the airbag 116 to the protection portions 120 and 121. The vertical passages 124 extend downward with the upper ends 124a communicated with the gas feed passage 129. Accordingly, upon inflow of the inflation gas G in the initial stage of deployment of the airbag 116, the vertical passages 124 are unfolded from upper side to lower side and expand. Then the protection portions 120 and 121 between the vertical passages 124 are unfolded and expand along with the unfolding of the vertical passages 124 in as thin condition as possible, since the protection portions 120 and 121 has not admitted so much inflation gas yet. Therefore, even if the space between the windows SW1 and SW2 and the occupants' heads is narrow, the protection portions 120 and 121 are able to expand swiftly, and to protect the occupants' heads properly by subsequent inflation.

Consequently, in the head protecting airbag device M2, too, although the airbag 116 is provided with a plurality of protection portions 120 and 121, the protection portions 120 and 121 are able to expand between the windows SW1 and SW2 and the occupants' heads smoothly, and to protect the occupants' heads properly by subsequent inflation.

In the head protecting airbag device M2, moreover, each of the front-seat and rear-seat protection portions 120 and 121 is formed by juxtaposing a plurality of transverse inflatable portions 123 along the front-rear direction. Accordingly, even if the vehicle interferes with such a vertically long object as a telegraph pole upon side impact collision, the transverse inflatable portions 123 vertically juxtaposed come to encounter the object substantially perpendicularly, so that the object is prevented from coming close to the occupants, and the occupants are properly protected. Furthermore, the inflatable portions 123 disposed transversely in the area of the gas admissive portion 117 help prevent the airbag 116 upon inflation from shrinking in the vehicle's front-rear direction. At completely inflated time, accordingly, it is possible to keep the volume of the airbag 116 as small as possible while securing the length in the front-rear direction of each of the front-seat and rear-seat protection portions 120 and 121. Moreover, since the front-seat and rear-seat protection portions 120 and 121 are composed of the transverse inflatable portions 123, even if the heads of occupants shift in the front-rear direction by such an incident as seats' sliding, energy absorbing property of the front-seat and rear-seat protection portions 120 and 121, which are positioned at the side of the heads, does not vary so much.

In the head protecting airbag device M2, furthermore, the vertical inflatable portions 125 extending vertically are arranged in the front and rear of the vertical passages 124 which are disposed in the front and rear of each of the protection portions 120 and 121. Upon completion of inflation of the airbag 116, wrinkles do not occur in the vertical inflatable portions 125, as in the border of the transverse inflatable portions 123 and the vertical passages 124. Therefore, the vertical inflatable portions 125 exert high shape retention property in the vertical direction. Accordingly, the front-seat and rear-seat protection portions 120 and 121 located between the vertical inflatable portions 125 are not easily bent and are able to protect the occupants' heads properly, even if pushed and moved outward by the occupants.

Figure 15:
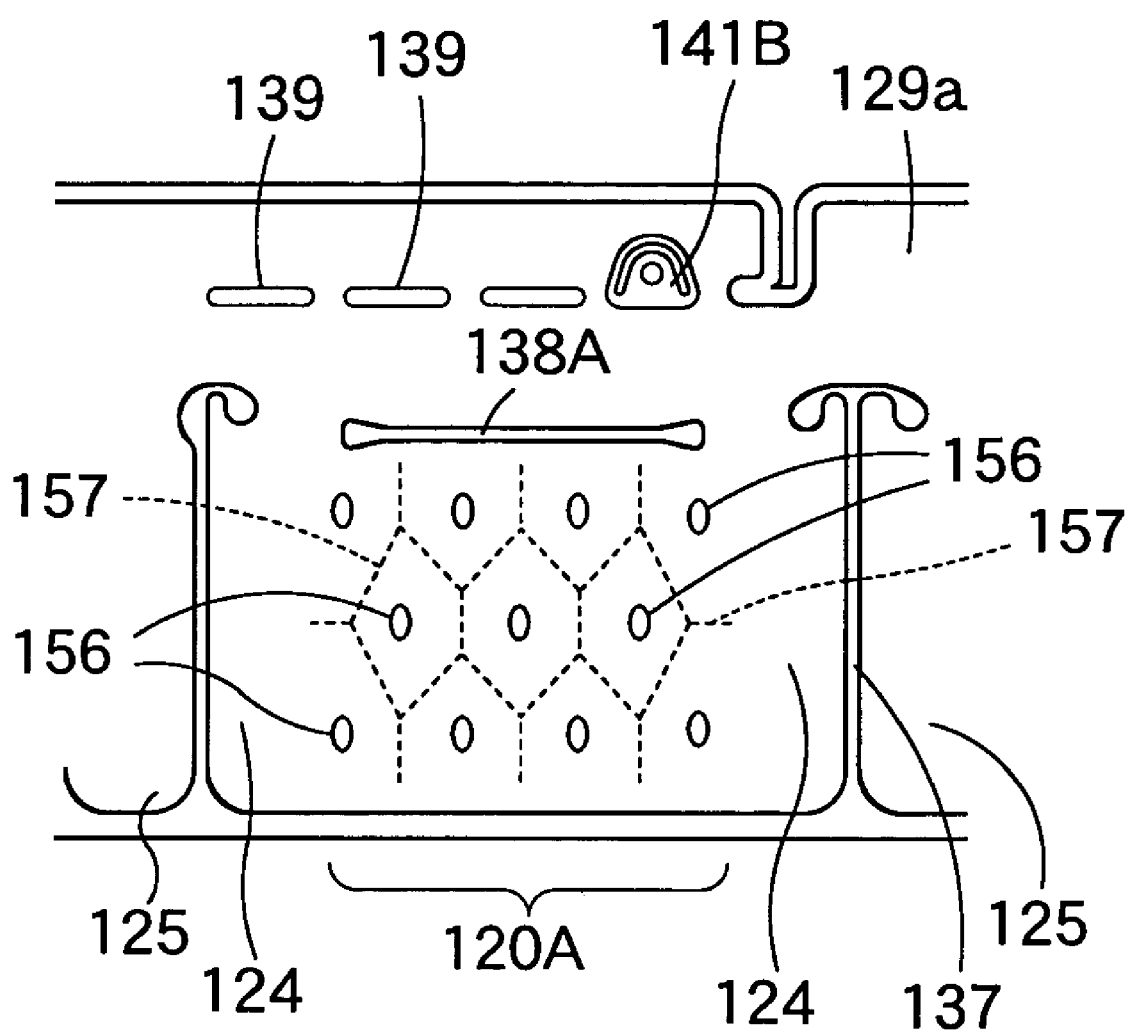
FIG. 15 is a partial enlarged front view of a modification of the airbag of FIG. 8.

The protection portions 120 and 121 in the airbag 116 may adopt a configuration shown in FIG. 15. It is seen in FIG. 15 that a protection portion 120A is partitioned by a plurality of partitions 156 spottedly disposed therein, each of which is a non-admissive portion. Any three of the partitions 156 neighboring one another are so located to form vertexes of a substantially equilateral triangle. In the embodiment, the partitions 156 are disposed in three lines along the front-rear direction, and the three lines are juxtaposed vertically. In an upper line, four partitions 156 are disposed straightly along the front-rear direction. In a middle line, three partitions 156 are disposed straightly along the front-rear direction such that each of the partitions may be positioned in a longitudinal middle of the partitions 156 in the upper line. In a lower line, four partitions 156 are disposed straightly along the front-rear direction at the same positions as the partitions 156 in the upper line.

When inflation gas flows into the protection portion 120A, center positions in neighboring partitions 156 inflate thickest, and constitute inflation tops 157. Since the partitions 156 are arranged to constitute vertexes of triangles, the inflation tops 157 form a hexagonal pattern, as shown in FIG. 15. In other words, the inflation tops 157 form a combination of unit shapes each of which is trifurcated in the center of a triangle formed by the partitions 156.

As the aforementioned airbag 116, the protection portion 120A has vertical passages 124 in the front and rear, and are partitioned from the gas feed passage 129 by a partition 138A. In the front and rear of each of the vertical passages 124, there are neighboring vertical inflatable portions 125 extending vertically.

With this configuration, too, since the inflation tops 157 are arranged in a hexagonal pattern, not straightly, the protection portion 120A is able to restrain occupants' heads securely with the inflation tops 157 regardless of the positions of occupants' heads, and thus is stable in energy absorbing property. Since the vertical inflatable portions 125 are located next to each of the vertical passages 124, moreover, the protection portion 120A is not easily bent even if pushed and moved outward by the occupants, and thus has high restraining property of the occupants' heads.

In the head protecting airbag device M2, moreover, the inlet ports 126 toward the window-ward shielding portion 119 have greater opening widths t1 than the opening widths t2 of the inlet ports 132 toward the roof-ward shielding portion 131. Accordingly, the window-ward shielding portion 119 admits inflation gas prior to the roof-ward shielding portion 131. In other words, since the window-ward shielding portion 119 inflates more swiftly than the roof-ward shielding portion 131, the occupants are protected by the window-ward shielding portion 119 swiftly and properly even if the occupants move toward the windows SW1 and SW2 immediately upon collision. Since the airbag 116 further includes the roof-ward shielding portion 131 for covering the vehicle's inner side I of the inner panel 2 at the roof side rail RR, the occupants are properly protected by the roof-ward shielding portion 131, even if the occupants move toward the roof side rail RR after shifting toward the window-ward shielding portion 119.

Therefore, the head protecting airbag device M2 is able to protect the occupants securely upon collision by the deployed airbag 116.

In the head protecting airbag device M2, the mounting portions 141 located on the upper edge of the window-ward shielding portion 119 are arranged in the area of the roof-ward shielding portion 131 by making the slits 142 at the upper peripheries of the mounting portion 141. As indicated by double-dotted lines in FIGS. 8 and 9, accordingly, the roof-ward shielding portion 131 surrounds the mounting portions 141 upon deployment of the airbag 116. Even if the occupants engage the vicinity of the mounting portions 141 of the airbag 116 in the roof side rail RR upon collision, the occupants come to engage the roof-ward shielding portion 131 inflated and surrounding the mounting portions 141. Consequently, the occupants are prevented from directly engaging the mounting brackets 146 and the bolts 147 for securing the mounting portions 141 to the body 1. Of course, without considering this point, the mounting portions 141 do not have to be arranged within the area of the roof-ward shielding portion 131.

In the head protecting airbag device M2, moreover, the roof-ward shielding portion 131 is provided with the cover portion 131a for covering the vehicle's inner side I of the inflator 149 upon deployment of the airbag 116. As shown in FIGS. 8 and 13, accordingly, the cover portion 131a covers the vehicle's inner side I of the inflator 149 upon deployment of the airbag 116. Even if the occupants engage the vicinity of the inflator 149 in the roof side rail RR upon collision, the occupants come to engage the inflated cover portion 131a. Consequently, the occupants are prevented and protected from directly engaging the inflator 149. Of course, without considering this point, the roof-ward shielding portion 131 does not have to include a cover portion 131a for covering the inner side of the inflator 149.

Figure 14:
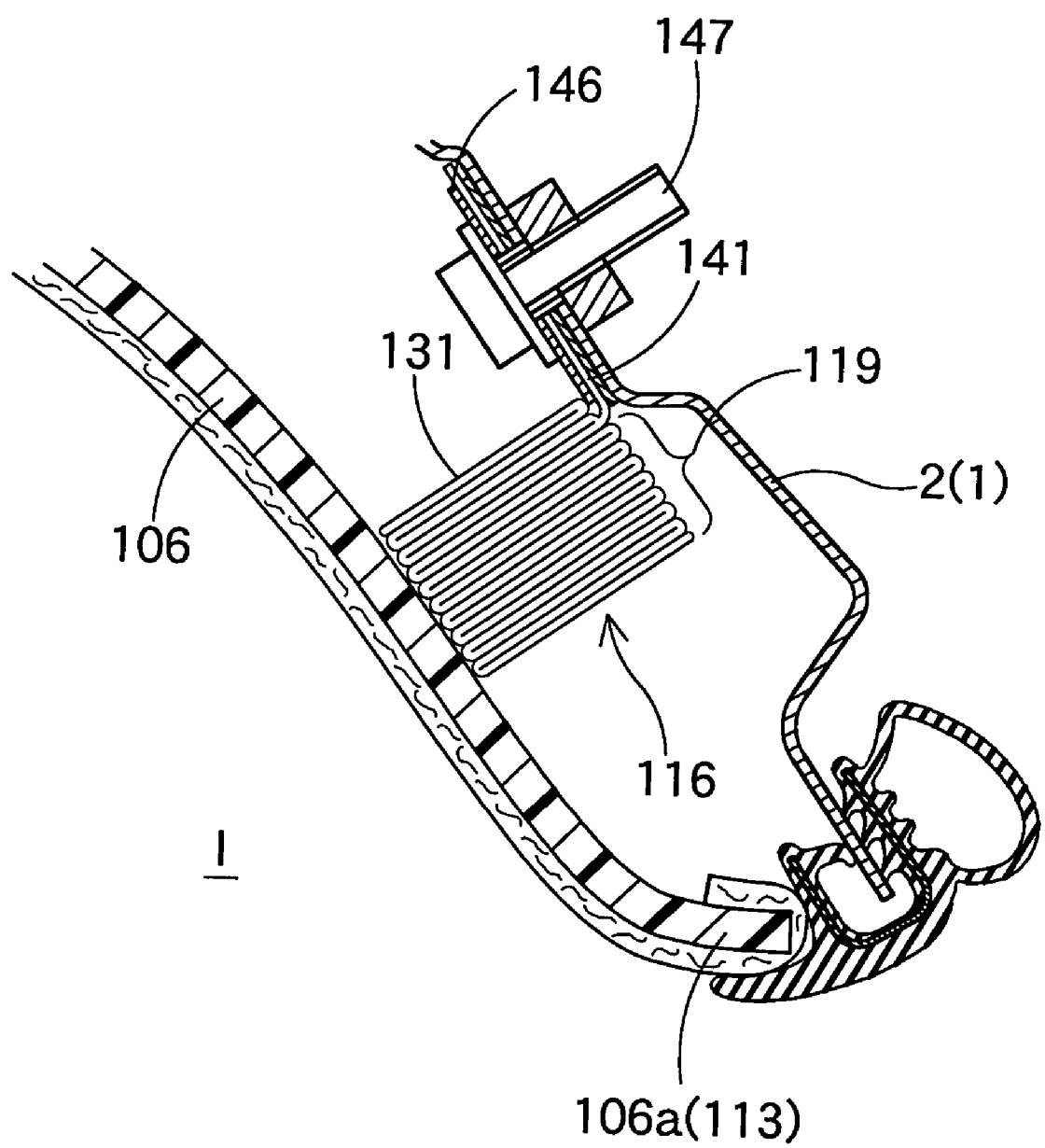
FIG. 14 is a schematic section of the airbag device of FIG. 8 showing another housing condition of airbag.

Although the second embodiment shows the airbag 116 firstly folded back at the roof-ward shielding portion 131 inward of the vehicle and then bellows-folded, it will also be appreciated to fold the airbag 116 as shown in FIG. 14 before housing. FIG. 14 illustrates an airbag 116 bellows-folded to bring the lower edge close to the upper edge without being folded back at the roof-ward shielding portion 131. When the airbag 116 is so folded, the individual mounting portions 141 are extracted from the wrapping member in wrapping the folded airbag, and the extracted mounting portions 141 are attached to the body 1.

Although the second embodiment takes a double-cab vehicle as an example of the vehicle V2 on which the airbag device M2 is mounted, the airbag device M2 may also be mounted on a sedan type vehicle, for example. To achieve only the second object of the present invention, the airbag device M2 may be mounted on a single-cab vehicle.

What is claimed is:

1. A head protecting airbag device comprising an airbag, which, when undeployed, is folded and located at the upper edge of window inside a vehicle, and the head protecting airbag device is deployable upon inflow of inflation gas to cover an inner side of the windows, the airbag comprising:

a gas admissive portion inflatable by admitting inflation gas while separating an inner side wall and an outer side wall respectively thereof; and non-admissive portions that admit no inflation gas, wherein:

the non-admissive portions are arranged along the longitudinal direction of the vehicle;

the gas admissive portion comprises a gas feed passage and an inflatable shielding portion;

the gas feed passage is located along the upper edge of the airbag and extends in the longitudinal direction of the vehicle;

the inflatable shielding portion is located below the gas feed passage for covering to inner side of the windows upon deployment, the inflatable shielding portion comprises:

a plurality of protection portions juxtaposed along the longitudinal direction of the vehicle, wherein the protection portions are partitioned from the gas feed passage by the non-admissive portion;

a plurality of vertical passages vertically disposed in the front and rear of each of the protection portions, the vertical passages being communicated at upper ends with the gas feed passage; and a communication passage located below the protection portions and extending along a lower edge of to airbag;

each of the protection portions receives inflation gas via the vertical passages, for protecting heads of occupants upon deployment of the airbag;

the communication passage is communicated with the vertical passages such that inflation gas enters the vertical passages and then the communication passage before entering the protection portions;

of the protection portions, at least a foremost protection portion for covering a window at the side of front seat comprises a plurality of vertical inflatable portions juxtaposed along the longitudinal direction of the vehicle, each of the vertical inflatable portions being arranged vertically and being communicated at lower end thereof with the communication passage; and the protection portions are closed entirely from the gas feed passage by the non-admissive portions between the vertical passages so that the protection portions receive inflation gas only via the vertical passages.

2. A head protecting airbag device comprising an airbag, which, when undeployed, is folded and located at the upper edge of windows inside a vehicle, and the head protecting airbag device is deployable upon inflow of inflation gas to cover an inner side of the windows, the airbag comprising:

a gas admissive portion inflatable by admitting inflation gas while separating an inner side wall and an outer side wall; and non-admissive portions that admit no inflation gas, wherein:

the non-admissive portions are arranged along the longitudinal direction of the vehicle;

the gas admissive portion comprises a gas feed passage and an inflatable shielding portion;

the gas feed passage is located along the upper edge of the airbag extending in the longitudinal direction of the vehicle;

the inflatable shielding portion is located below to gas feed passage for covering the inner side of the windows upon deployment, the inflatable shielding portion comprises:

a plurality of protection portions juxtaposed along the longitudinal direction of the vehicle, wherein the protection portions are partitioned from the gas feed passage by the non-admissive portion; and a plurality of vertical passages vertically disposed in the front and rear of each of the protection portions, the vertical passages being communicated at upper ends with the gas feed passage;

each of the protection portions receive inflation gas via the vertical passages, for protecting heads of occupants upon deployment of the airbag;

each of the protection portions comprises a plurality of transverse inflatable portions juxtaposed in the vertical direction, each of the transverse inflatable portions being disposed along the longitudinal direction of the vehicle and being communicated with the vertical passages;

each transverse inflatable portion has a longitudinal dimension and a vertical dimension, and the longitudinal dimension is greater than the vertical dimension, when the airbag is inflated;

the inflatable shielding portion further comprises vertical inflatable portions vertically disposed next to the vertical passages in the front and rear of the vertical passages; and the protection portions are closed entirely from the gas feed passage by the non-admissive portions between the vertical passage so that the protection portions receive inflation gas only via the vertical passages.

3. A head protecting airbag device comprising an airbag, which, when undeployed, is folded and located at the upper edge of windows inside a vehicle, and the head protecting airbag device is deployable upon inflow of inflation gas to cover an inner side of the windows, the airbag comprising:

a gas admissive portion inflatable by admitting inflation gas while separating an inner side wall and an outer side wall; and non-admissive portions that admit no inflation gas, wherein:

the gas admissive portion comprises a gas feed passage and an inflatable shielding portion;

the gas feed passage is located along the upper edge of the airbag extending in the longitudinal direction of the vehicle;

the inflatable shielding portion is located below the gas feed passage for covering the inner side of the windows upon deployment, and the inflatable shielding portion comprises:

a plurality of protection portions juxtaposed along the longitudinal direction of the vehicle, wherein the protection portions are partitioned from the gas feed passage by the non-admissive portion; and a plurality of vertical passages vertically disposed in the front and rear of each of the protection portions, the vertical passages being communicated at upper ends with the gas feed passage;

each of the protection portions receive inflation gas via the vertical passages, for protecting heads of occupants upon deployment of the airbag;

a plurality of spottedly arranged non-admissive portions are formed in the protection portions, thereby forming trifurcated inflation tops between the spottedly arranged non-admissive portions;

the spottedly arranged non-admissive portions are arrange to define a plurality of parallel lines that extend along the longitudinal direction of the vehicle;

the spottedly arranged non-admissive portions of one of the parallel lines are located between the spottedly arranged non-admissve portions of an adjacent one of the parallel lines;

the inflatable shielding portion further comprises vertical inflatable portions vertically disposed next to the vertical passages in the front and rear of the vertical passages; and the protection portions are closed entirely from the gas feed passage by the non-admissive portions between the vertical passages so that the protection portions receive inflation gas only via the vertical passages.

4. A head protecting airbag device comprising: an airbag, which, when undeployed, is located at the upper edge of windows inside a vehicle, the head protecting airbag device being deployable upon inflow of inflation gas; and an inflator for supplying inflation gas to the airbag, wherein the airbag comprises a gas admissive portion inflatable upon inflow of inflation gas, the gas admissive portion comprising:

a window-ward shielding portion for covering an inner side of the windows; and a roof-ward shielding portion for covering an inner side of a body-ward member in a roof side rail located above the windows, respectively upon deployment, wherein:

the window-ward shielding portion is positioned upstream of the roof-ward shielding portion in the flow of inflation gas;

the inflator is located in the upper edge of the windows;

the airbag comprises:

a gas feed passage for delivering inflation gas to the window-ward shielding portion and the roof-ward shielding portion, and the gas feed passage extends in a longitudinal direction of the vehicle between the window-ward shielding portion and the roof-ward shielding portion; and a joint port located at the upper edge of the windows so as to be connected to the inflator; and the roof-ward shielding portion comprises a cover portion for covering an inner side of the inflator upon deployment of the airbag, wherein the cover portion covers the inner side of the inflator entirely in the longitudinal direction and the vertical direction of the vehicle.

5. The head protecting airbag device according to claim 4, wherein:

the airbag further comprises a plurality of mounting portions at the upper edge of the window-ward shielding portion for securing the airbag to the body-ward member in the upper edge of the windows; and the mounting portions are disposed in the area of the roof-ward shielding portion, and have slits in the upper periphery thereof.

\* \* \* \* \*